United States Patent
Yokoya et al.

(10) Patent No.: US 9,721,572 B2
(45) Date of Patent: Aug. 1, 2017

(54) DEVICE CONTROL METHOD AND ELECTRIC DEVICE

(71) Applicant: Panasonic Intellectual Property Corporation of America, Torrance, CA (US)

(72) Inventors: Mayu Yokoya, Osaka (JP); Katsuyoshi Yamagami, Osaka (JP); Yasunori Ishii, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 14/743,704

(22) Filed: Jun. 18, 2015

(65) Prior Publication Data

US 2016/0005404 A1    Jan. 7, 2016

(30) Foreign Application Priority Data

Jul. 1, 2014   (JP) .................................. 2014-135899
Mar. 13, 2015  (JP) .................................. 2015-050967

(51) Int. Cl.
*G10L 21/00* (2013.01)
*G10L 25/00* (2013.01)
(Continued)

(52) U.S. Cl.
CPC .............. *G10L 17/22* (2013.01); *G06F 3/167* (2013.01); *G08C 17/00* (2013.01); *H04N 21/233* (2013.01);
(Continued)

(58) Field of Classification Search
None
See application file for complete search history.

(56) References Cited

U.S. PATENT DOCUMENTS

2002/0043557 A1*  4/2002  Mizoguchi ........ H04M 1/72533
                                                           235/375
2003/0065515 A1*  4/2003  Yokota ............... G01C 21/3608
                                                           704/270
(Continued)

FOREIGN PATENT DOCUMENTS

EP          2905677          8/2015
JP       2001-307540        11/2001
(Continued)

OTHER PUBLICATIONS

The Extended European Search Report dated Nov. 6, 2016 for the related European Patent Application No. 15173226.0.
(Continued)

*Primary Examiner* — Marcus T Riley
(74) *Attorney, Agent, or Firm* — Greenblum & Bernstein, P.L.C.

(57) ABSTRACT

A method for controlling an operation of a target device using a plurality of input devices is disclosed. The method comprises: receiving from one of the plurality of the input devices a first operation instruction issued to the target device, with a first data format; recognizing the first operation instruction and the first data format; determining that the one of the plurality of the input devices is a first input device corresponding to the first data format; and providing to a user of the target device a recommendation for a second input device, a type of the second input device being different from a type of the first input device, when it is determined that a type of the first operation instruction is identical to a type of a second operation instruction received from the second input device earlier than the reception of the first operation instruction.

17 Claims, 27 Drawing Sheets

(51) Int. Cl.

| | | |
|---|---|---|
| *G10L 17/22* | (2013.01) | |
| *G08C 17/00* | (2006.01) | |
| *H04N 21/233* | (2011.01) | |
| *H04N 21/258* | (2011.01) | |
| *H04N 21/41* | (2011.01) | |
| *H04N 21/422* | (2011.01) | |
| *H04N 21/431* | (2011.01) | |
| *H04N 21/436* | (2011.01) | |
| *H04N 21/439* | (2011.01) | |
| *H04N 21/488* | (2011.01) | |
| *H04N 21/654* | (2011.01) | |
| *H04N 21/658* | (2011.01) | |
| *G06F 3/16* | (2006.01) | |
| *G10L 15/22* | (2006.01) | |
| *H04N 5/44* | (2011.01) | |
| *G10L 15/30* | (2013.01) | |

(52) U.S. Cl.
CPC ... *H04N 21/25808* (2013.01); *H04N 21/4131* (2013.01); *H04N 21/4222* (2013.01); *H04N 21/42203* (2013.01); *H04N 21/42204* (2013.01); *H04N 21/42222* (2013.01); *H04N 21/4312* (2013.01); *H04N 21/4394* (2013.01); *H04N 21/43615* (2013.01); *H04N 21/4882* (2013.01); *H04N 21/654* (2013.01); *H04N 21/6582* (2013.01); *G08C 2201/31* (2013.01); *G10L 15/22* (2013.01); *G10L 15/30* (2013.01); *G10L 2015/223* (2013.01); *H04N 2005/4432* (2013.01)

(56) References Cited

U.S. PATENT DOCUMENTS

| | | | |
|---|---|---|---|
| 2003/0103088 A1* | 6/2003 | Dresti | G06F 3/0481 715/835 |
| 2006/0235701 A1 | 10/2006 | Cane et al. | |
| 2011/0218808 A1 | 9/2011 | Parthasarathy | |
| 2014/0169795 A1* | 6/2014 | Clough | G06F 19/3418 398/106 |
| 2015/0116096 A1* | 4/2015 | Adachi | G08C 17/02 340/12.5 |
| 2015/0277547 A1 | 10/2015 | Kobayashi | |

FOREIGN PATENT DOCUMENTS

| | | |
|---|---|---|
| JP | 2003-114698 | 4/2003 |
| JP | 2012-132052 | 7/2012 |
| WO | 2014/054384 | 4/2014 |

OTHER PUBLICATIONS

The Extended European Search Report dated Feb. 15, 2016 for the related European Patent Application No. 15173226.0.

* cited by examiner

FIG. 8

| RESULT OF SPEECH RECOGNITION | OPERATION COMMAND |
|---|---|
| POWER ON | C001 |
| TURN ON POWER | C001 |
| INCREASE VOLUME | C002 |
| 8ch | C003 |
| INCREASE AIR FLOW | C004 |
| . . . | . . . |

FIG. 9A

| OPERATION COMMAND | TYPE OF TARGET DEVICE | DEVICE OPERATION |
|---|---|---|
| C001 | TELEVISION | POWER ON/OFF |
| C002 | TELEVISION | CONTROL VOLUME |
| C003 | TELEVISION | CHANGE CHANNEL |
| C004 | AIR CONDITIONER | CONTROL AIR FLOW |
| ... | ... | ... |

FIG. 9B

| INPUT DEVICE ID | INPUT DEVICE | INPUT METHOD |
|---|---|---|
| I001 | SPEECH INPUT DEVICE | SPEECH |
| I002 | REMOTE CONTROL | BUTTON OPERATION |
| I003 | SMARTPHONE | TOUCHSCREEN OPERATION |
| ... | ... | ... |

| OPERATION NUMBER | OPERATION COMMAND | TIME |
|---|---|---|
| N001 | C002 | 07/01/2014 20:05:09 |
| N002 | C002 | 07/01/2014 20:05:33 |

FIG. 13A

| OPERATION COMMAND | RECOMMENDED INPUT DEVICE ID |
|---|---|
| C001 | UI001 |
| C002 | UI002, UI003 |
| C003 | UI002 |
| C004 | UI001 |
| C005 | UI004 |
| ... | ... |

FIG. 13B

| RECOMMENDED INPUT DEVICE ID | INPUT DEVICE | INPUT METHOD |
|---|---|---|
| UI001 | SPEECH INPUT DEVICE | SPEECH |
| UI002 | REMOTE CONTROL | BUTTON OPERATION |
| UI003 | SMARTPHONE | TOUCHSCREEN OPERATION |
| ... | | ... |

FIG. 15A

| DISTANCE D (RADIUS) BETWEEN USER AND RECOMMENDED INPUT DEVICE | WHETHER TO PRESENT POSITION INFORMATION OF RECOMMENDED INPUT DEVICE | PRESENTATION METHOD ID |
|---|---|---|
| D < 0.3 m | NO | |
| 0.3 ≤ D ≤ 1.0 | YES | P001 |
| 1.0 < D | YES | P002 |

FIG. 15B

| PRESENTATION METHOD ID | PRESENTATION DEVICE | PRESENTATION METHOD |
|---|---|---|
| P001 | REMOTE CONTROL | SPEECH |
| P002 | TELEVISION | DISPLAY ON SCREEN |
| . . . | | . . . |

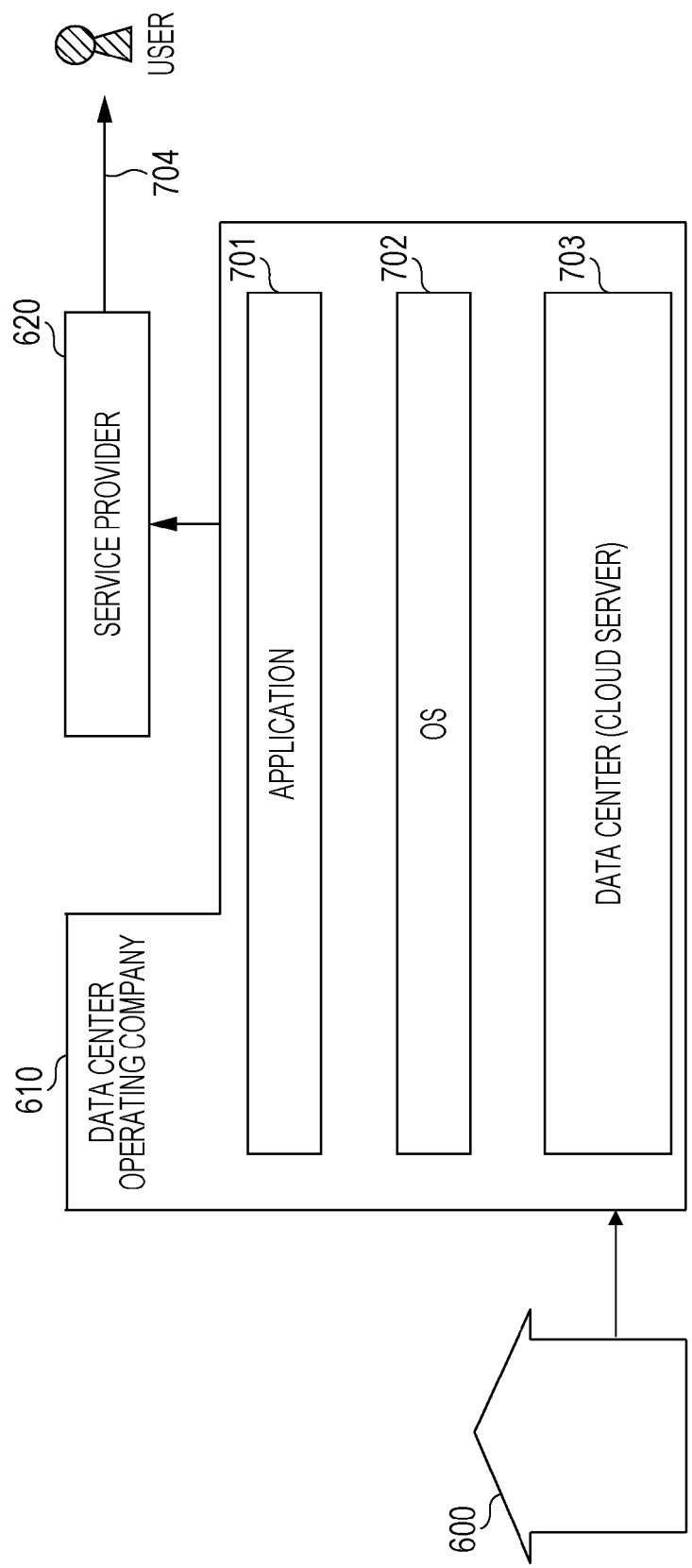

DEVICE CONTROL METHOD AND ELECTRIC DEVICE

BACKGROUND

1. Technical Field

The present disclosure relates to a method for controlling an electric device whose operation can be controlled using multiple input devices, and such an electric device.

2. Description of the Related Art

With the development of speech recognition technology, speech recognition accuracy has been significantly improved in recent years. Accordingly, there have been considered device management systems in which various types of devices are operated using speeches. It is expected that the user will be able to control the various types of devices by uttering desired operations toward the devices, without having to perform troublesome button operations.

SUMMARY

However, such systems still have many matters to be considered and have to be further improved for commercialization.

In one general aspect, the techniques disclosed here feature a method for controlling an operation of a target device using a plurality of input devices. The method comprises: receiving from one of the plurality of the input devices a first operation instruction issued to the target device, with a first data format; recognizing the first operation instruction and the first data format; determining that the one of the plurality of the input devices is a first input device corresponding to the first data format; and providing to a user of the target device a recommendation for a second input device, a type of the second input device being different from a type of the first input device, when it is determined that a type of the first operation instruction is identical to a type of a second operation instruction received from the second input device earlier than the reception of the first operation instruction.

These general and specific aspects may be implemented using a system, a method, and a computer program, and any combination of systems, methods, and computer programs.

According to the above aspect, the above system can be further improved.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 8 is a diagram showing a device operation determination table according to the embodiment;

FIG. 9A is a diagram showing an example of an operation command table according to the embodiment;

FIG. 9B is a diagram showing an example of an input device ID table according to the embodiment;

FIG. 13A is a diagram showing an example of a recommended input device determination table according to the embodiment;

FIG. 13B is a diagram showing an example of a recommended input device ID table according to the embodiment;

FIG. 15A is a diagram showing an example of a presentation method determination table according to the embodiment;

FIG. 15B is a diagram showing an example of a presentation method ID table according to the embodiment;

FIG. 29 is a diagram showing an overview of services provided by an information management system of service type 4 (SaaS cloud services) according to the embodiment.

DETAILED DESCRIPTION

Figure 1:
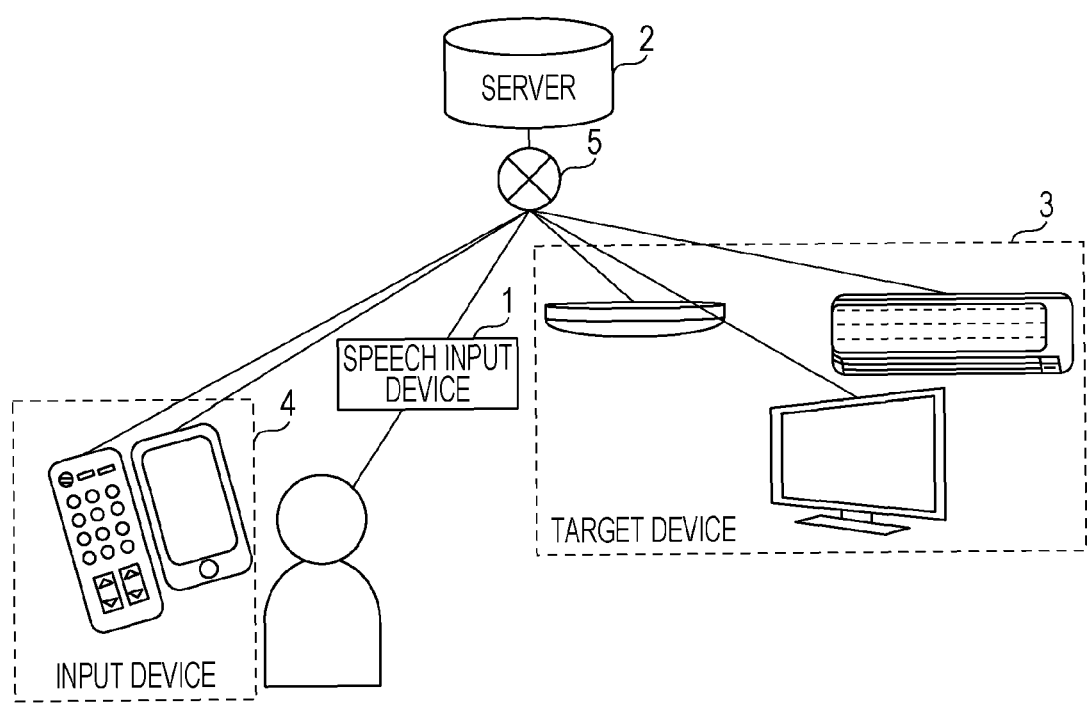
FIG. 1 is a drawing showing an overview of a speech operation system according to an embodiment.

Underlying Knowledge Forming Basis of the Present Disclosure

The user can directly give an instruction to the target device by transmitting an operation command to the target device using speech input. Thus, such an operation using speech input may be simpler than an operation performed on an input device such as a remote control to give an instruction to the target device. For example, the user can more easily perform the desired operation by using speech input than using a remote control to open the menu window and then select an item corresponding to the desired operation or than using a remote control to input a phrase to be searched for.

There are command reception devices capable of receiving both command input using a remote control and command input using a speech (e.g., Japanese Unexamined Patent Application Publication No. 2003-114698).

Japanese Unexamined Patent Application Publication No. 2003-114698 discloses a control device having a speech recognition function, a switch with which the user externally inputs various types of commands, data, or the like, a display device for displaying images, and a microphone for inputting a speech. This control device receives a command, data, or the like inputted by the user from the switch or microphone, processes the received command or the like, and outputs the result of the processing to the display device. If a command inputted using the switch can also be inputted using a speech through the microphone, the control device notifies the user that the command can be inputted using a speech.

However, each time a command which can be inputted using a speech is inputted using the switch, this technology notifies the user that the command can be inputted using a speech. Accordingly, even when the user thinks that the user can more easily perform an operation on the device by using the remote control and then does so, if the command for that operation can be inputted using a speech, the user receives a notification to that effect, thereby feeling annoyed. That is, this background technology cannot issue a notification to the user while distinguishing between an operation suitable for command input using a speech and an operation suitable for command input using the remote control.

As described above, the user can directly give an instruction to the target device by transmitting an operation command to the target device using speech input and therefore such an operation using speech input may be simpler than an operation performed on an input device such as a remote control to give an instruction to the target device. On the other hand, if the buttons of the remote control correspond to operations, such as power-on/off, the change of the television channel, and the control of the television volume, one-on-one, the user may be able to perform the desired operation more easily by operating the buttons than by using speech input as long as the user remembers the positions of the buttons. Accordingly, if the user can properly select between command input using a speech and command input using the remote control, he or she can more easily perform the desired operation on the target device.

In view of the foregoing, the inventors have conceived of the following modifications to improve the functions of a speech device operation system.

A method according to one embodiment of the present invention is a method for controlling an operation of a target device using a plurality of input devices. The method includes receiving, from one of the plurality of the input devices, a first operation instruction issued to the target device, with a first data format; recognizing the received first operation instruction and the first data format; determining that the one of the plurality of the input devices is a first input device corresponding to the recognized first data format; and providing to a user of the target device a recommendation for a second input device, a type of the second input device being different from a type of the first input device, when it is determined that a type of the first operation instruction is identical to a type of a second operation instruction that is received from the second input device earlier than the reception of the first operation instruction from the first input device. Since a second input device different from the first input device is presented to the user when the user performs an operation which is not suitable for the first input device, it is possible to notify the user that the user can more easily perform the desired operation on the target device. Further, the user can more easily perform the desired operation by using the second input device.

In one embodiment, for example, the first input device may include a speech input device, a remote controller, or a mobile phone, the first data format may include a data format for a communication using at least one of a speech input device, a remote controller, or a mobile phone, each of the type of the first operation instruction and the type of the second operation instruction include a control for turning on/off power of the target device, a volume control when the target device is a television set, and an airflow control when the target device is an air conditioner In one embodiment, for example, the method may further include whether the type of the first operation instruction is identical to the type of the second operation instruction, when a second time when the second operation instruction is received from the second input device falls within a predetermined time period prior to a first time when the first operation instruction is received from the first input device. Thus, if the user performs the same operation multiple times within a predetermined period of time, the second input device suitable for the operation can be presented to the user.

In one embodiment, for example, the method may further include determining whether the type of the first operation instruction is identical to the type of the second operation instruction, when the second operation instruction is received from the second input device immediately before a first time when the first operation instruction is received from the first input device. Thus, if the user performs the same operations consecutively, a second input device suitable for the operations can be presented to the user.

In one embodiment, for example, the method may further include storing recommended input device information about the type of the second input device suitable to the type of the first operation instruction; and determining that the type of the first operation instruction is suitable to the type of the second input device based on the recommended input device information. Thus, a second input device suitable for the operation performed by the user can be presented to the user.

In one embodiment, for example, the target device may be capable of receiving the first operation instruction from the second input device. Thus, the operation of the target device can be controlled using the multiple input devices.

In one embodiment, for example, the second input device may include at least one of a speech input device, a remote controller, or a mobile phone.

In one embodiment, for example, a sound stating that the second input device may the speech input device, the remote controller, or the mobile phone may be outputted toward the user. Thus, the user can recognize a second input device suitable for the operation through the sound.

In one embodiment, for example, the target device may be a television set, and the second input device includes a remote controller, and the recommendation for the second input device may be provided to the user by displaying on a display device of the television set an image i) indicating an appearance of the remote controller and ii) highlighting an operation portion capable of performing the first operation instruction, of the remote controller. Thus, the user can understand which part of the remote control serving as a second input device he or she should operate.

In one embodiment, for example, the method may further include storing time information indicating a time when each of operation instructions has been received; and calculating a receiving frequency of the same type of operation instruction as the first operation instruction in a predetermined period of time, on the basis of the time information, to present to the user the recommendation for the second input device on the basis of the calculated receiving frequency. Thus, if the user performs the same operation multiple times within the predetermined period of time, a second input device suitable for the operation can be presented to the user.

In one embodiment, for example, if the calculated receiving frequency is greater than or equal to a predetermined value, the second input device is provided to the user. Thus, if the user performs the same operation a predetermined number of times or more within the predetermined period of time, a second input device suitable for the operation can be presented to the user.

In one embodiment, for example, the method may further include recognizing whether the first input device is the speech input device; recognizing whether the first instruction does not include an operating range for an operation indicated by the first operation instruction; when the first input device is recognized to be the speech input device and when the first instruction does not include the operating range, determining that the speech input device is not suitable to the type of the first operation instruction. By presenting a second input device different from the first input device to the user when there is no history information of the operation corresponding to the type of the first operation instruction, the user can avoid performing troublesome operations on the first input device.

An electric device according to one embodiment of the present disclosure is an electric device, operation of the electric device capable to be controlled using a plurality of input devices The electric device includes a processor; and a non-transitory memory storing thereon a program, which executed by the processor, causes the processor to: receive, from one of the plurality of the input devices, a first operation instruction issued to the electric device, with a first data format; recognize the received first operation instruction and the first data format; determine that the one of the plurality of the input devices is a first input device corresponding to the recognized first data format; and provide to a user of the electric device a recommendation for a second input device, a type of the second input device being different from a type of the first input device, when it is determined that a type of the first operation instruction is identical to a type of a second operation instruction that is received from the second input device earlier than the reception of the first operation instruction from the first input device.

Since a second input device different from the first input device is presented to the user when the user performs an operation which is not suitable for the first input device, the user can more easily perform the desired operation on the target device.

A computer program according to one embodiment of the present disclosure is a non-transitory computer-readable recording medium storing a program for controlling an electric device, operation of the electric device capable to be controlled using a plurality of input devices. The computer program causing a computer of the electric device to: receive, from one of the plurality of the input devices, a first operation instruction issued to the electric device, with a first data format; recognize the received first operation instruction and the first data format; determine that the one of the plurality of the input devices is a first input device corresponding to the recognized first data format; and provide to a user of the electric device a recommendation for a second input device, a type of the second input device being different from a type of the first input device, when it is determined that a type of the first operation instruction is identical to a type of a second operation instruction that is received from the second input device earlier than the reception of the first operation instruction from the first input device.

Since a second input device different from the first input device is presented to the user when the user performs an operation which is not suitable for the first input device, the user can more easily perform the desired operation on the target device.

A method according to one embodiment of the present disclosure is a method for controlling an operation of a target device using a plurality of input devices including a speech input device. The method includes acquiring, from the speech input device, speech information including I) environmental sound around the speech input device and ii) a speech instruction indicating an operation instruction issued to the target device; calculating a level of noise included in the speech information; recognizing the operation instruction indicated by the speech instruction; recognizing a type of the operation instruction based on the recognition result of the operation instruction; and providing to a user of the target device a recommendation for a second input device on the basis of the calculated noise level and the recognized type of the operation instruction, wherein a type of the second input device does not include speech type. Since a second input device different from the speech input device is presented to the user on the basis of the noise level, it is possible to avoid performing a different operation from the operation intended by the user.

In one embodiment, for example, the recommendation for the second input device may be determined based on i) the calculated noise level, ii) the recognized type of the operation instruction, and iii) recommended input device information, wherein the recommended input device information indicates an input device suitable to each operation instruction type. Thus, a second input device suitable for the environment in which noise is occurring can be presented to the user.

In one embodiment, for example, if the noise level is higher than or equal to a predetermined value, the recommendation for the second input device may be provided to the user. By presenting a second input device different from the speech input device to the user when the noise level is higher than the predetermined value, it is possible to avoid performing a different operation from the operation intended by the user.

A method according to one embodiment of the present disclosure is a method for controlling an operation of a target device using a plurality of input devices including a speech input device The method includes acquiring, from the speech input device, speech information including an operation instruction issued to the target device; recognizing the operation instruction included in the speech information; recognizing a type of the operation instruction based on the recognition result of the operation instruction; calculating a likelihood of the recognized operation instruction; and providing to a user of the target device a recommendation for a second input device on the basis of the recognized likelihood and the recognized type of the operation instruction, wherein a type of the second input device does not include speech type.

Since a second input device different from the speech input device is presented to the user on the basis of the likelihood, it is possible to avoid performing a different operation from the operation intended by the user.

In one embodiment, for example, the recommendation for the second input device may be determined based on i) the recognized likelihood, ii) the recognized type of the operation instruction, and iii) recommended input device information, wherein the recommended input device information indicates an input device suitable to each operation instruction type. Thus, a second input device suitable for a condition under which the likelihood of speech input is low can be presented to the user.

In one embodiment, for example, the recommendation for the second input device may be determined based on i) the recognized likelihood, ii) the recognized type of the operation instruction, and iii) recommended input device information, wherein the recommended input device information indicates an input device suitable to each operation instruction type. By presenting a second input device different from the speech input device to the user when the likelihood is lower than the predetermined value, it is possible to avoid performing a different operation from the operation intended by the user.

Now, an embodiment will be described with reference to the accompanying drawings. However, the embodiment described below is only illustrative. The numbers, shapes, elements, steps, the order of the steps, and the like described in the embodiment are also only illustrative and do not limit the technology of the present disclosure. Of the elements of the embodiment, elements which are not described in the independent claims representing the highest concept will be described as optional elements.

Overview of Services Provided

First, there will be described an overview of services provided by an information management system according to the present embodiment.

Figure 25A:
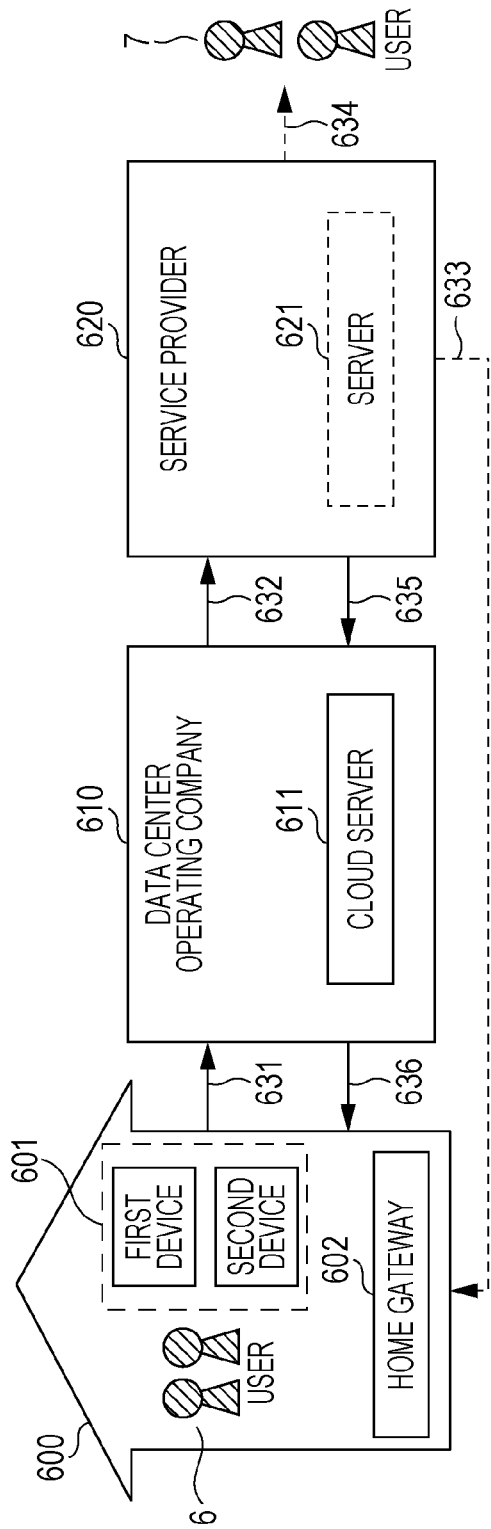
FIG. 25A is a diagram showing an overview of services provided by an information management system according to the embodiment.

FIG. 25A is a diagram showing an overview of the services provided by the information management system according to the present embodiment. The information management system includes a group 600, a data center operating company 610, and a service provider 620.

The group 600 is, for example, a corporation, organization, or household and may have any size. The group 600 includes multiple devices 601 including first and second devices, and a home gateway 602. The devices 601 include devices which can be connected to the Internet (e.g., smartphone, personal computer (PC), and television) and devices which cannot be connected to the Internet by themselves (e.g., lighting system, washer, and refrigerator). The devices 601 may include devices which cannot be connected to the Internet by themselves but can be connected thereto through the home gateway 602. Users 6 use the devices 601 in the group 600.

The data center operating company 610 includes a cloud server 611. The cloud server 611 is a virtual server that cooperates with various devices through the Internet. The cloud server 611 mostly manages big data or the like, which is difficult to handle using a typical database management tool or the like. The data center operating company 610 performs the management of the data, the management of the cloud server 611, the operation of a data center which performs those, and the like. Details of the operation performed by the data center operating company 610 will be described later.

Figure 25C:
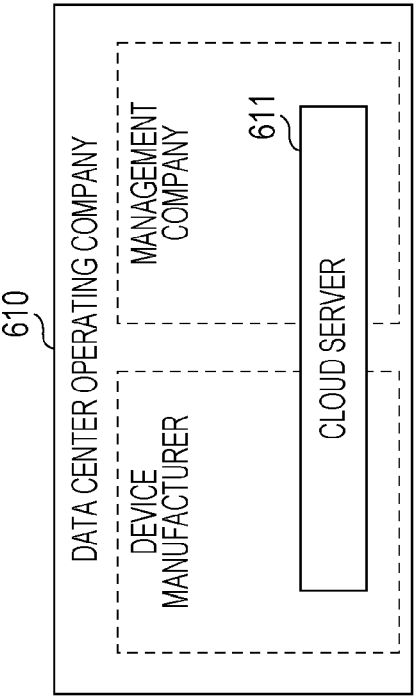
FIG. 25C is a diagram showing an example in which both or one of a device manufacturer and a management company serve as a data center operating company according to the embodiment.
Figure 25B:
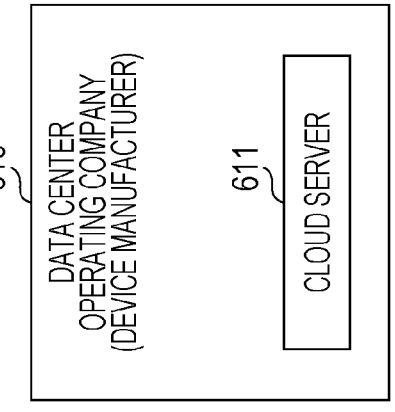
FIG. 25B is a diagram showing an example in which a device manufacturer serves as a data center operating company according to the embodiment.

The data center operating company 610 is not limited to a corporation which only manages the data or cloud server 611. For example, as shown in FIG. 25B, if a device manufacturer which develops or manufactures one of the devices 601 is also performing the management of the data or cloud server 611, or other operations, the device manufacturer serves as the data center operating company 610. Further, there may be multiple data center operating companies 610. For example, as shown in FIG. 25C, if a device manufacturer and a management company jointly manage the data or cloud server 611 or share such management, both or either one thereof serve as the data center operating company 610.

The service provider 620 includes a server 621. The server 621 may have any size and may be, for example, a memory in a personal computer (PC). The service provider 620 need not necessarily include the server 621.

Further, the information management system need not necessarily include the home gateway 602. For example, if the cloud server 611 manages all the data, the information management system does not have to include the home gateway 602. There are also cases in which any device which cannot be connected to the Internet by itself does not exist, like cases in which all devices in the household are connected to the Internet.

Next, the flow of information in the information management system will be described.

First, the first and second devices in the group 600 transmit log information thereof to the cloud server 611 of the data center operating company 610. The cloud server 611 accumulates the log information of the first and second devices (an arrow 631 in FIG. 25A). As used herein, the log information is information indicating the operating state, operation date/time, or the like of each of the devices 601. For example, The log information is the viewing history of a television, information about the programmed recording of a recorder, the operation date/time of a washer, the amount of laundry, the date/time or frequency of opening/closure of a refrigerator, but is not limited thereto. It may be various types of information available from various types of devices. The log information may be directly provided to the cloud server 611 by the devices 601 through the Internet. The log information from the devices 601 may be temporarily accumulated in the home gateway 602 and then provided to the cloud server 611 by the home gateway 602.

Subsequently, the cloud server 611 of the data center operating company 610 provides a predetermined amount of the accumulated log information to the service provider 620. The predetermined amount may be an amount obtained by compiling the information accumulated in the data center operating company 610 so that the information can be provided to the service provider 620, or may be an amount requested by the service provider 620. Further, the log information need not necessarily be provided in the predetermined amount, and the amount of the log information to be provided may be changed according to the situation. The log information is stored in the server 621 held by the service provider 620 as necessary (an arrow 632 in FIG. 25A).

The service provider 620 organizes the log information into information suitable for services to be provided to users and then provides the resulting information to the users. The users to which such information is provided may be the users 6, who use the devices 601, or may be external users 7. The method for providing the information to the users 6 or 7 may be, for example, to provide the information directly to the users 6 or 7 by the service provider 620 (arrows 633, 634 in FIG. 25A). The method for providing information to the users 6 may also be to provide the information to the users 6 again through the cloud server 611 of the data center operating company 610 (arrows 635, 636 in FIG. 25A). Further, the cloud server 611 of the data center operating company 610 may organize the log information into information suitable for services to be provided to users and then provide the resulting information to the service provider 620.

The users 6 may be the same as the external users 7 or may differ therefrom.

FIG. 1 is a drawing showing an overview of a speech operation system according to the present embodiment.

As shown in FIG. 1, the speech operation system according to the present embodiment includes a speech input device 1, a server 2, target devices 3, input devices 4, and a network 5. The speech input device 1 acquires a speech generated by the user and transmits the acquired speech to the server 2. The server 2 transmits or receives data to or from the speech input device 1, target devices 3, and input devices 4. Each target device 3 performs an operation indicated by a device operation command received from the server 2 and determines whether there is any recommended input device suitable for that operation except for the speech input device. Each input device 4 receives input information from the user and transmits the position information of the input device. The network 5 connects the speech input device 1, server 2, target devices 3, and input devices 4 to each other using a communication method such as a wired or wireless LAN or Bluetooth®.

The target devices 3 are electric devices whose operation can be controlled using multiple input devices including the speech input device 1. The target devices 3 include, for example, a television, a recorder, an air-conditioner, a lighting system, an audio system, a telephone, an intercommunication system, and the like.

In the present embodiment, one or both of the speech input device 1 and server 2 may be incorporated into each target device 3.

Figure 2:
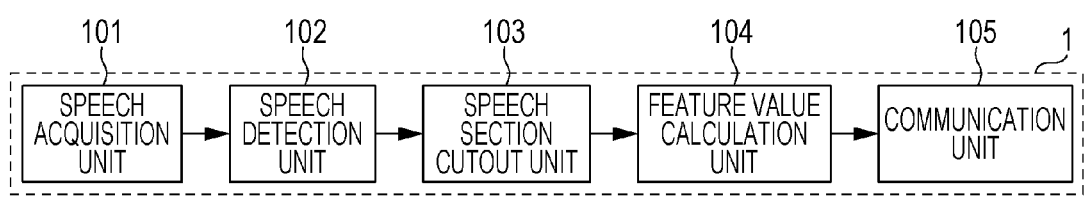
FIG. 2 is a block diagram showing a speech input device according to the embodiment.

FIG. 2 is a block diagram showing an example of the specific elements of the speech input device 1 according to the present embodiment. As shown in FIG. 2, the speech input device 1 includes a speech acquisition unit 101, a speech detection unit 102, a speech section cutout unit 103, a feature value calculation unit 104, and a communication unit 105. The speech acquisition unit 101 detects a speech. The speech detection unit 102 determines whether the speech has been detected. The speech section cutout unit 103 detects the section in which the speech inputted by the user exists, of the acquired speech signal and cuts out the detected speech section, since the speech signal includes noise or the like. The feature value calculation unit 104 calculates the feature value of the speech on the basis of the cut-out speech section. The communication unit 105 transmits the calculated speech feature value to the server 2.

The speech input device 1 is, for example, a microphone incorporated in or connected to each target device 3, a microphone incorporated in a remote control included with each target device 3 or the like, a microphone incorporated in or connected to a mobile communication terminal, or a sound concentrating microphone placed in the house.

At least some of the elements of the speech input device 1 can be implemented by a microcomputer and a memory. For example, the speech detection unit 102, speech section cutout unit 103, and feature value calculation unit 104 can be implemented by a microcomputer and a memory. In this case, the microcomputer performs the above processes on the basis of a computer program read from the memory.

Figure 3:
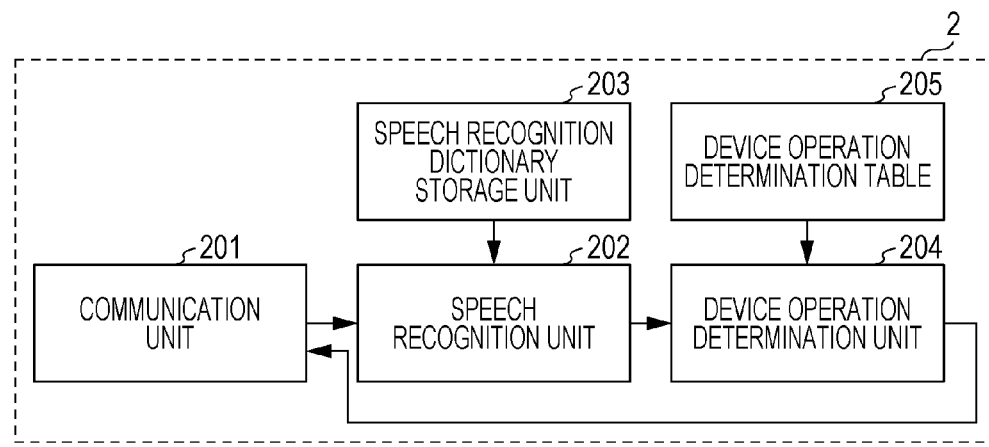
FIG. 3 is a block diagram showing a server according to the embodiment.

FIG. 3 is a block diagram showing an example of the specific elements of the server 2 according to the present embodiment. As shown in FIG. 3, the server 2 includes a communication unit 201, a speech recognition unit 202, a speech recognition dictionary storage unit 203, a device operation determination unit 204, and a device operation determination table 205. The communication unit 201 receives the speech feature value transmitted by the communication unit 105 of the speech input device 1 and transmits an operation command and the ID of the input device to the corresponding target device 3. The speech recognition unit 202 converts the received speech feature value into character strings or word strings on the basis of information in the speech recognition dictionary storage unit 203. The speech recognition dictionary storage unit 203 are storing spoken sentences which may be inputted to the target devices 3, as shown in FIG. 8. For example, it is storing device operation-related spoken sentences such as "power on" and "increase the volume" and small talk-related spoken sentences such as "good morning" and "tell the weather." Details of the table shown in FIG. 8 will be described later.

The device operation determination unit 204 determines an operation command from the result of the speech recognition on the basis of the device operation determination table 205. As shown in FIGS. 9A and 9B, the device operation determination table 205 is storing operation commands and input device IDs. For example, the device operation determination table 205 is storing the following information: the operation command for powering on the television is C001; the operation command for controlling the volume of the television is C002; the ID of the speech input device, to which a speech is inputted, is I001, and the ID of the remote control whose buttons are operated is I002. Details of the tables shown in FIGS. 9A and 9B will be described later.

At least some of the elements of the server 2 can be implemented by a microcomputer and a memory. For example, the speech recognition unit 202, speech recognition dictionary storage unit 203, device operation determination unit 204, and device operation determination table 205 can be implemented by a microcomputer and a memory. In this case, the microcomputer performs the above processes on the basis of a computer program read from the memory.

Figure 4:
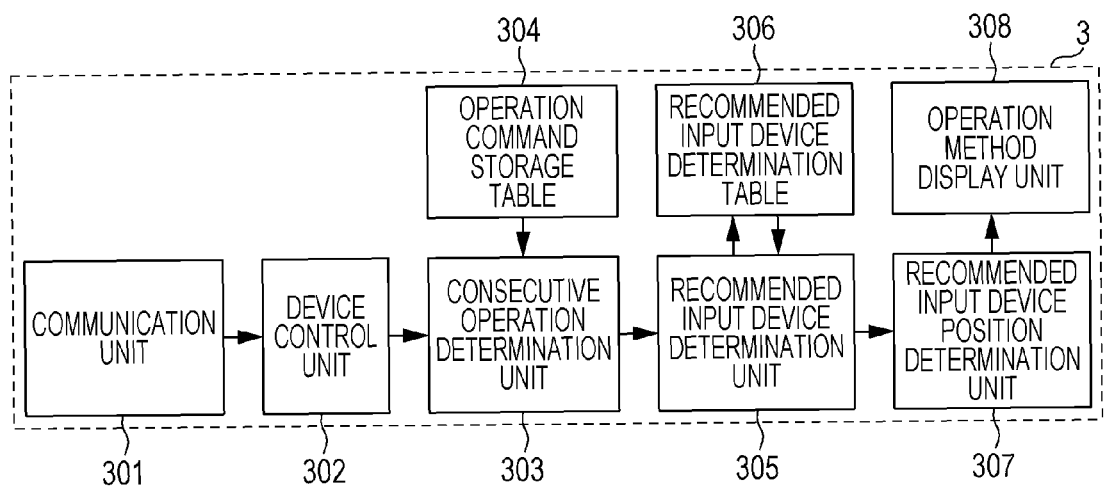
FIG. 4 is a block diagram showing a target device according to the embodiment.

FIG. 4 is a block diagram showing an example of the specific elements of one of the target devices 3 according to the present embodiment. As shown in FIG. 4, the target device 3 includes a communication unit 301, a device control unit 302, a consecutive operation determination unit 303, an operation command storage table 304, a recommended input device determination unit 305, a recommended input device determination table 306, a recommended input device position determination unit 307, and an operation method display unit 308.

Figures 11A, 11B:
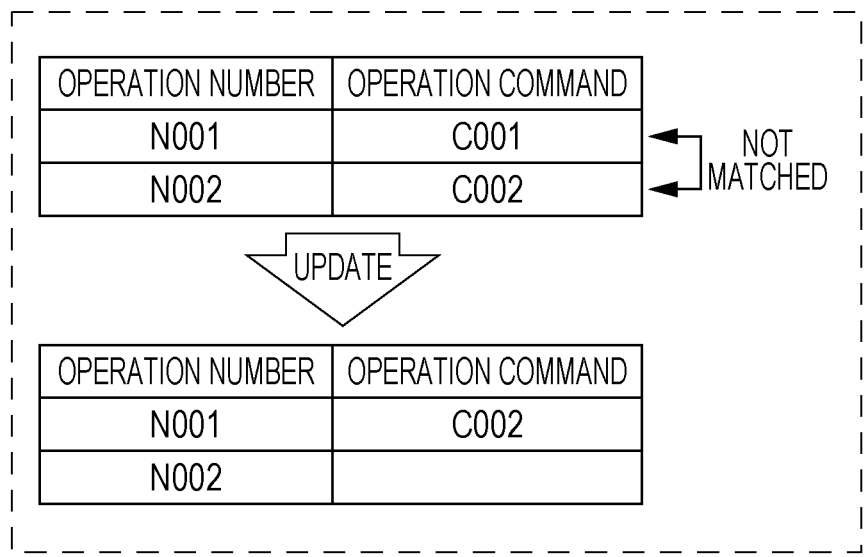
FIGS. 11A and 11B are diagrams showing an example of an operation command storage table according to the embodiment.

The communication unit 301 receives the operation command and input device ID transmitted by the server 2. The device control unit 302 recognizes an operation instruction indicated by the received operation command, as well as recognizes an input device which has received an operation related to the operation instruction from the user, on the basis of the received input device ID. The device control unit 302 then controls the operation of the target device 3 in accordance with the received operation command. The consecutive operation determination unit 303 determines whether the user has consecutively inputted operations, on the basis of the operation command storage table 304. As shown in FIG. 11A, the operation command storage table 304 is storing histories of operation commands inputted by the user. Details of the history information shown in FIG. 11A will be described later.

The recommended input device determination unit 305 determines a recommended input device on the basis of the recommended input device determination table 306. As shown in FIGS. 13A and 13B, the recommended input device determination table 306 is storing operation commands and corresponding recommended input devices. For example, it is storing an operation command C001 and a corresponding recommended input device ID "UI001," which represents the speech input device using speech input. Details of the tables shown in FIGS. 13A and 13B will be described later.

The recommended input device position determination unit 307 determines the position of the recommended input device on the basis of information in a position information acquisition unit 401 and then determines whether to present the user with the position of the recommended input device. The operation method display unit 308 presents the user with the recommended input device and the position thereof on the basis of the determinations made by the recommended input device determination unit 305 and recommended input device position determination unit 307.

At least some of the elements of the target device 3 can be implemented by a microcomputer and a memory. For example, the device control unit 302, consecutive operation determination unit 303, operation command storage table 304, recommended input device determination unit 305, recommended input device determination table 306, and recommended input device position determination unit 307 can be implemented by a microcomputer and a memory. In this case, the microcomputer performs the above processes on the basis of a computer program read from the memory.

Figure 5:
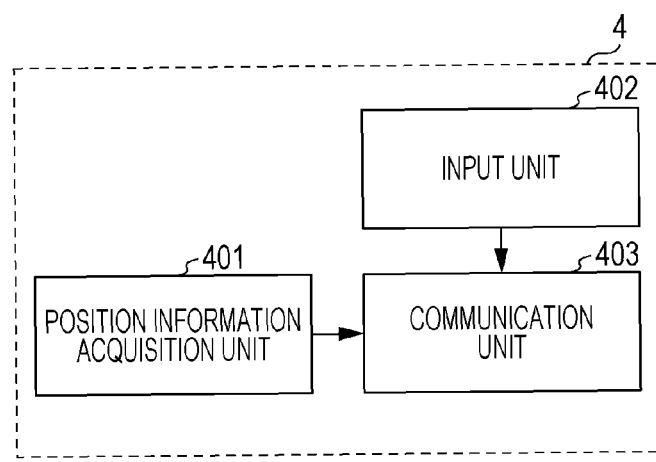
FIG. 5 is a block diagram showing an input device according to the embodiment.

FIG. 5 is a block diagram showing an example of the specific elements of one of the input devices 4 according to the present embodiment. As shown in FIG. 5, the input device 4 includes the position information acquisition unit 401, an input unit 402, and a communication unit 403. The position information acquisition unit 401 acquires the position of the input device 4 with respect to the user. The input unit 402 acquires information that the user has inputted by operating the buttons or by touching on the smartphone screen. The communication unit 403 transmits the information acquired by the position information acquisition unit 401 and input unit 402 to the server 2 or corresponding target device 3. The input device 4 is, for example, one which receives input through the buttons, one which receives input through the touchscreen, or one which receives input through a gesture, but not limited thereto. It may be an input device of any type other than speech input type, as long as the input device can transmit an operation command to the target device 3.

At least some of the elements of the input device 4 can be implemented by a microcomputer and a memory. For example, the position information acquisition unit 401 and input unit 402 can be implemented by a microcomputer and a memory. In this case, the microcomputer performs the above processes on the basis of a computer program read from the memory.

Figure 6:
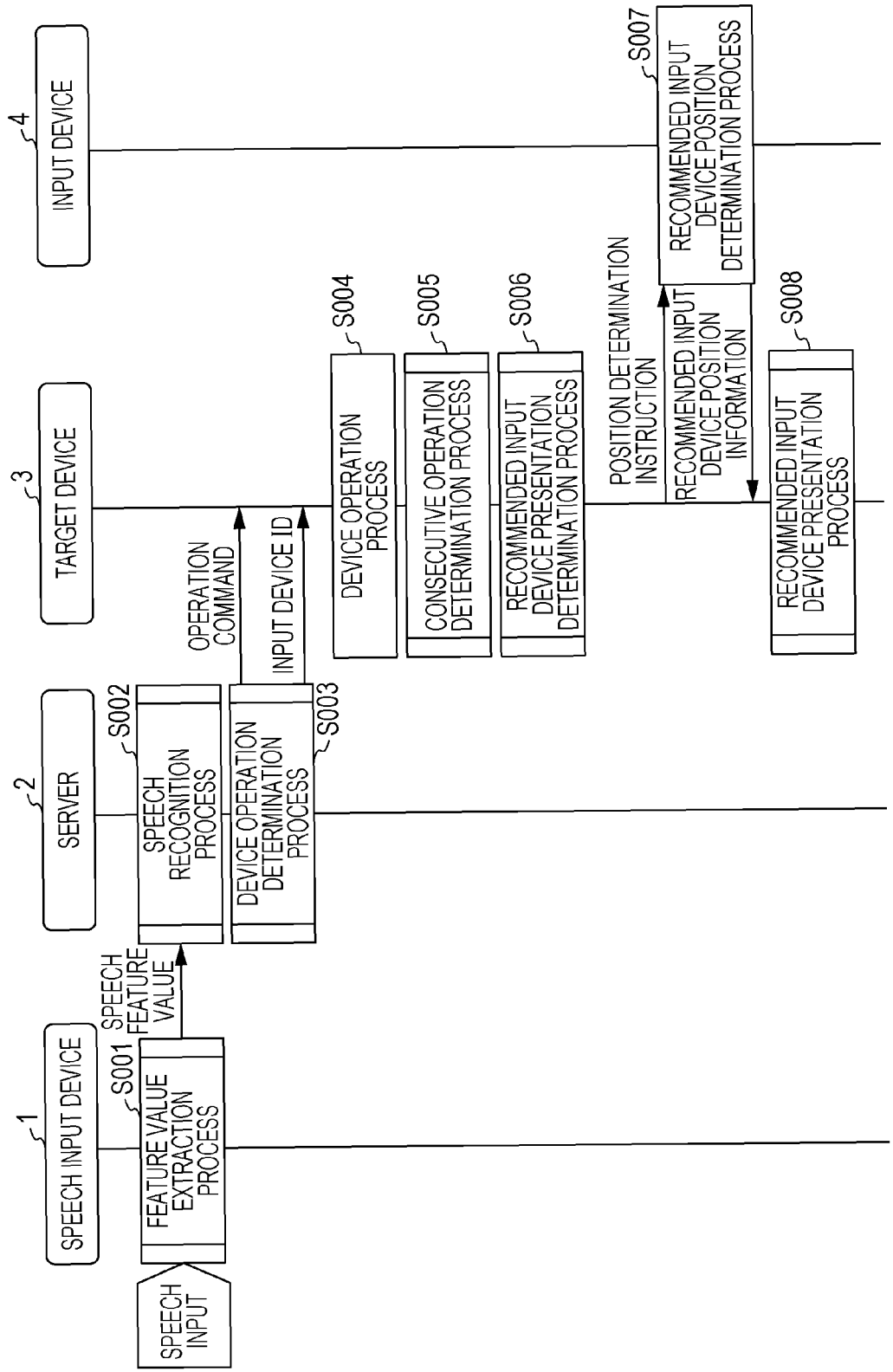
FIG. 6 is a diagram showing a sequence in the speech operation system according to the embodiment.

FIG. 6 is a diagram showing a sequence in the speech operation system according to the present embodiment.

First, in step S001, the speech input device 1 calculates the feature value of a speech and transmits it to the server 2. In step S002, the server 2 performs a speech recognition process, that is, it converts the received speech feature value into character strings or word strings on the basis of the information in the speech recognition dictionary of the speech recognition dictionary storage unit 203. In step S003, the server 2 determines the type of a target device and a device operation intended by the user and transmits a corresponding operation command and input device ID to a corresponding target device 3. Details of the process in step S003 will be described later.

In step S004, the target device 3 determines whether it can actually perform the operation command transmitted in step S003. For example, if the target device 3, which is a television, receives an operation command for controlling the volume with the television powered off, it cannot perform the operation.

In step S005, the target device 3 determines whether the operation performed in step S004 is the same as the immediately preceding operation. Details of the process in step S005 will be described later. If the target device 3 determines in step S005 that operations have been performed consecutively, it performs a process in step S006.

In step S006, the target device 3 determines whether, with respect to the operation instruction inputted by the user, there are any other input devices 4 which are recommended over the speech input device 1. Details of the process in step S006 will be described later. If there are any input devices 4 which are recommended over the speech input device 1, the respective input devices 4 perform a process in step S007.

In step S007, the recommended input devices 4 determined in step S006 each determine the position thereof. Examples of the method for determining the position include the following: if each input device 4 includes a pressure sensor, it determines whether the user is holding the input device 4, based on whether there is a pressure; if each input device 4 includes a position sensor such as a GPS, RFID, or infrared ID, it determines the position using the position sensor; each input device 4 determines the position using the transmission/reception information of communication radio waves in a wireless LAN, Bluetooth, or the like; if the target device 3 includes a position acquisition unit equivalent to an input device 4, the relative positions of the input devices 4 and target device 3 are determined; and if the target device 3 includes a camera, the position of the user is estimated using camera information, and the relative positions of the input devices 4, user, and target device 3 are determined.

Note that appropriate positions may be selected as the relative positions of the user, input devices 4, and target device 3 in accordance with the device used or operation command. In step S008, a recommended input device which is most suitable for the operation command is shown to the user on the basis of the position information of the recommended input devices determined in step S007. Details of the process in step S008 will be described later.

Figure 7:
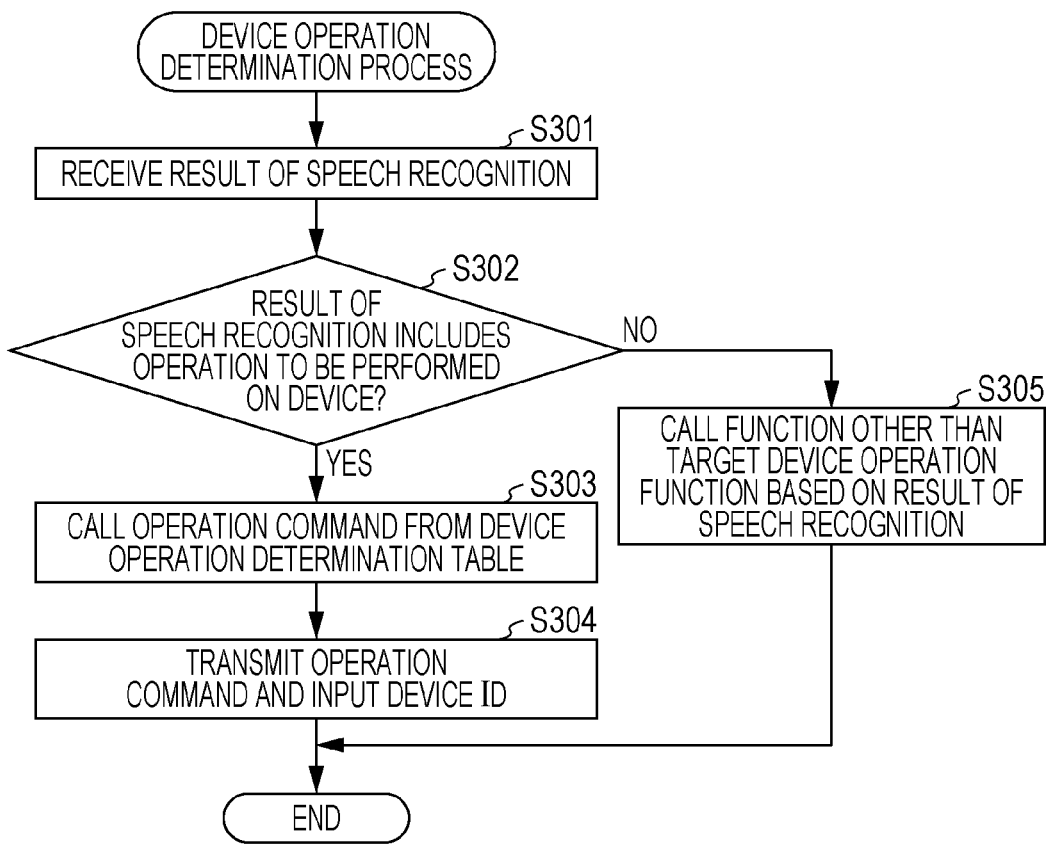
FIG. 7 is a flowchart showing a device operation determination process according to the embodiment.

FIG. 7 is a flowchart showing the steps of the device operation determination process according to the present embodiment. In this process, the server 2 determines whether the speech inputted by the user includes an operation instruction issued to a target device 3, on the basis of the result of the speech recognition.

First, in step S301, the server 2 receives the character stings or word strings, which are the result of the speech recognition. In step S302, the server 2 determines whether the result of the speech recognition includes an operation to be performed on a target device 3. Specifically, the server 2 determines whether the result of the speech recognition includes the type of a target device 3 such as a "television" or "air conditioner" or a phrase indicating an operation to be performed on a target device 3, such as ""power on" or "increase the volume." If so determined, the process proceeds to step S303; not so determined, the process proceeds to step S305.

In step S303, the server 2 calls an operation command corresponding to the result of the speech recognition on the basis of the device operation determination table in FIG. 8. In step S304, the server 2 transmits, to the target device 3, the operation command called in step S303, as well as an input device ID recognized based on the input device ID table of FIG. 9B and representing the speech input device.

In step S305, the speech operation system calls a function other than the target device operation function on the basis of the result of the speech recognition and then performs the called function. For example, if a speech "tell the weather" has been inputted by the user, the speech operation system calls a Q&A function rather than the device operation function. For example, in response to the speech "tell the weather" inputted by the user, the speech operation system makes a response "what area's weather do you want to know?" or a response "today's weather is sunny."

FIG. 8 is a diagram showing the device operation determination table for determining a device operation command from the result of speech recognition according to the present embodiment.

In the device operation determination table, respective speech recognition results and corresponding operation commands are stored in the transverse (row) direction. Note that a device operation determination table may be generated for each target device 3. These operation commands represent the types of operations inputted by the user.

For example, if a speech "power on" is inputted to the speech input device 1, an operation command "C001" is called from the device operation determination table of FIG. 8. Note that in the device operation determination table, multiple speech recognition results may be associated with a single operation command. This is because the user may generate a speech "power on" or may generate a speech "turn on the power" in inputting a speech to issue a command for powering on a target device, that is, even when the user intends the same operation, he or she may use a different speech expression.

FIG. 9A is a diagram showing an operation command table, and FIG. 9B is a diagram showing an input device ID table.

In the operation command table shown in FIG. 9A, respective operation commands and corresponding target device types and device operations are stored in the transverse (row) direction. In the input device ID table shown in FIG. 9B, respective input device IDs and corresponding input devices and input methods are stored in the transverse (row) direction.

For example, when a speech "power on" is inputted to the speech input device 1, an operation command C001, as well as an input device ID I001 are called. Note that there may be operation commands which include fine adjustments such as "increase the volume by 1" and "decrease the volume by 1."

Figure 10:
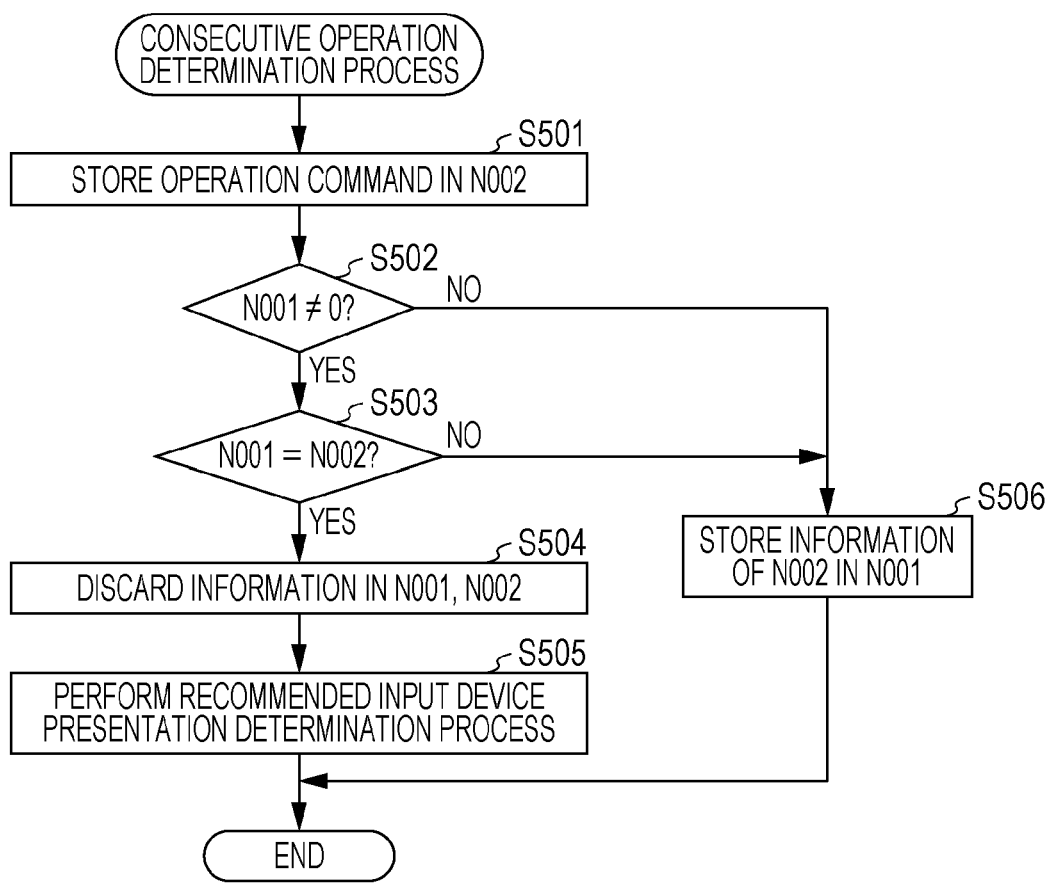
FIG. 10 is a flowchart showing a consecutive operation determination process according to the embodiment.

FIG. 10 is a flowchart showing the steps of the consecutive operation determination process according to the present embodiment. In this process, the consecutive operation determination unit 303 of the target device 3 determines whether the user has performed the same operations consecutively.

In step S501, the consecutive operation determination unit 303 stores the operation command transmitted in step S304, in the operation number N002 of the operation command storage table shown in FIG. 11A. In step S502, the continuous operation determination unit 303 determines whether any operation command is stored in the operation number N001 of the operation command storage table. If so determined, the process proceeds to step S503; if not so determined, the process proceeds to step S506.

If the respective operation commands stored in the operation numbers N001 and N002 are matched in step S503, the process proceeds to step S504. If the operation commands stored in the operation numbers N001 and N002 are not matched, the process proceeds to step S506.

In step S504, the consecutive operation determination unit 303 confirms that the operations are consecutive and then discards the operation command information stored in the operation numbers N001 and N002. The process proceeds to step S505. In step S505, the recommended input device determination unit 305 performs a recommended input device presentation determination process, ending the consecutive operation determination process.

If the consecutive operation determination unit 303 determines in step S502 or S503 that the operations are not consecutive, it performs step S506. It stores the operation command stored in the operation number N002, in the operation number N001.

Owing to the consecutive operation determination process, only when the user has performed operations consecutively using an input device other than a recommended input device set for each operation command, the recommended input device is presented to the user. Thus, for example, if the user who is viewing the television performs an operation "increase the volume by one stage," to which an input device other than the speech input device is set as a recommended input device, using the speech input device only once, a message such as "use of the remote control is recommended in order to control the volume" does not appear on the screen. Accordingly, such a message is prevented from hindering the viewing of the television by the user. That is, such a message is prevented from appearing each time the user performs an operation using an input device other than the recommended input device, thereby reducing the annoyance of the user. Further, by presenting the recommended input device to the user, the user can learn selective use of an input device for each operation command.

For example, if the user inputs a speech "power on" as the first operation, an operation command C001 is stored in the operation number N002 in step S501. Then, in step S502, it is determined that no operation command is stored in the operation number N001. Accordingly, the process proceeds to step S506 to store the operation command C001 stored in the operation number N002, in the operation number N001.

Subsequently, if the user inputs a speech "increase the volume," an operation command C002 is stored in the operation number N002 in step S501. In step S502, C001 is stored in the operation number N001. Accordingly, the process proceeds to step S503. In step S503, the operation numbers N001 and N002 are not matched, since C001 is stored in the operation number N001 and C002 is stored in the operation number N002. Accordingly, the process proceeds to step S506 to store C002 stored in the operation number N002, in the operation number N001.

Subsequently, if the user inputs a speech "increase the volume" consecutively, the same operations as those when inputting the second speech are performed until step S503. In step S503, the operation numbers N001 and N002 are matched, since C002 is stored in the operation number N001 and C002 is stored in the operation number N002. Accordingly, the process proceeds to step S504. In step S504, C002 stored in both the operation numbers N001 and N002 is discarded. The process proceeds to S505 to perform a recommended input device presentation determination process. Thus, the consecutive operation determination process ends.

FIG. 11A is a diagram showing an example of the operation command storage table according to the present embodiment. The operation command storage table is storing history information indicating an operation command received earlier than the current operation command. Thus, the types of the operations inputted by the user can be recognized based on the stored operation commands. The operation command storage table is used in the consecutive operation determination process.

In the operation command storage table shown in FIG. 11A, respective operation numbers and corresponding operation commands are stored in the transverse (row) direction. If the respective operation commands stored in the operation numbers N001 and N002 are matched in step S503, those operation commands are discarded. In contrast, if the operation commands stored in the operation numbers N001 and N002 are not matched in step S503, the operation command stored in the operation number N002 is stored in the operation number N001.

Note that the operation command storage table may include time information indicating the time when each operation command has been inputted. FIG. 11B is a diagram showing an operation command storage table including such time information. If the operation command storage table includes time information, operation commands to be compared may be the latest operation command and an operation command which has been inputted within a predetermined period of time before the latest operation command has been inputted. Operation commands to be compared may also be the latest operation command and an operation command which has been inputted immediately before the latest operation command has been inputted. While the examples in which two operation numbers are stored are shown in FIGS. 11A and 11B, three or more operation numbers may be stored.

Figure 12:
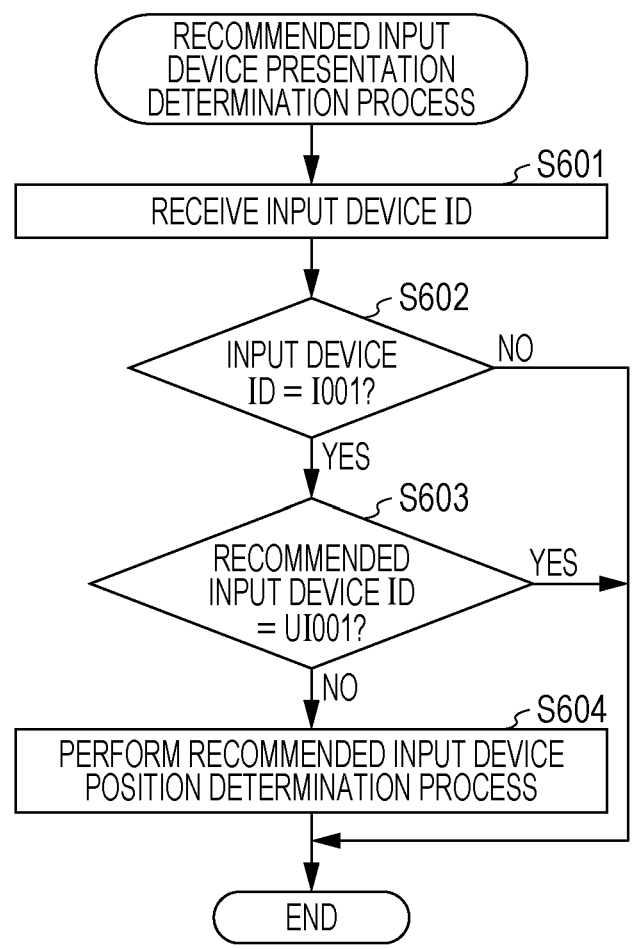
FIG. 12 is a flowchart showing a recommended input device presentation determination process according to the embodiment.

FIG. 12 is a flowchart showing the steps of the recommended input device presentation determination process according to the present embodiment. In this process, when the user inputs a speech to the speech input device to operate the target device, the recommended input device determination unit 305 determines whether any input device other than the speech input device is set as a recommended input device.

In step S601, the recommended input device determination unit 305 receives the input device ID transmitted in step S304. In step S602, the recommended input device determination unit 305 determines whether the input device ID is I001 representing the speech input device to determine whether the user has operated the target device using speech input. If so determined, the process proceeds to step S603; if not so determined, the process ends. In step S603, the recommended input device determination unit 305 refers to information in the recommended input device determination table shown in FIG. 13A and recommended input device ID information shown in FIG. 13B to determine whether a recommended input device ID corresponding to the operation command of the device operation performed by the user represents the speech input device or any other input device.

If the recommended input device ID is UI001 representing the speech input device, the recommended input device determination unit 305 can determine that it is appropriate that the user has inputted the speech to the speech input device to operate the device and that there is no need to recommend any other input device to the user. Accordingly, the recommended input device determination unit 305 ends the recommended input device presentation determination process without performing a recommended input device position determination process.

In contrast, if the recommended input device ID is not UI001 representing the speech input device, the process proceeds to step S604. In step S604, the recommended input device determination unit 305 determines that with respect to the device operation performed by the user, there is an input device other than the speech input device, and the recommended input device position determination unit 307 performs a recommended input device position determination process.

For example, if the user inputs a speech "increase the volume" corresponding to an operation command C002 twice consecutively, the recommended input device determination unit 305 receives the input device ID I001 representing the speech input device in step S304 each time. In step S602, the received input device ID is I001. Accordingly, the process proceeds to step S603. In step S603, an operation using the remote control or touchscreen is recommended over an operation using a speech with respect to C002 on the basis of the recommended input device determination table shown in FIG. 13A. Accordingly, the process proceeds to step S604 to perform a recommended input device position determination process.

For example, assume that the user operates the television using multiple input devices such as the speech input device, remote control, and smartphone. While the user can more easily input a keyword by using speech input when searching for a program, the user can more easily operate the television by using a fast-feedback device such as the remote control when controlling the volume as desired by the user. However, for a user who cannot selectively use the multiple input devices, he or she inputs a speech "increase the volume" or a speech "decrease the volume" a number of times in an attempt to control the volume using speech input. Thus, the user feels annoyed about speech input. In view of the foregoing, the recommended input device presentation determination process is performed. Thus, if input devices other than the speech input device are previously set as recommended input devices, the recommended input devices are presented to the user. Thus, the user can know whether the inputted operation command is suitable for speech input. As a result, the user can learn selective use of operation commands suitable for speech input and other input devices and thus can selectively use the recommended multiple input devices and reduce the annoyance associated with use of the multiple input devices.

FIG. 13A is a diagram showing an example of the recommended input device determination table, and FIG. 13B is a diagram showing an example of the recommended input device ID table.

In the recommended input device determination table, respective operation commands and corresponding recommended input device IDs are stored in the transverse (row) direction. In the recommended input device ID table, respective recommended input device IDs and corresponding input devices and input methods are stored in the transverse (row) direction.

Figure 14:
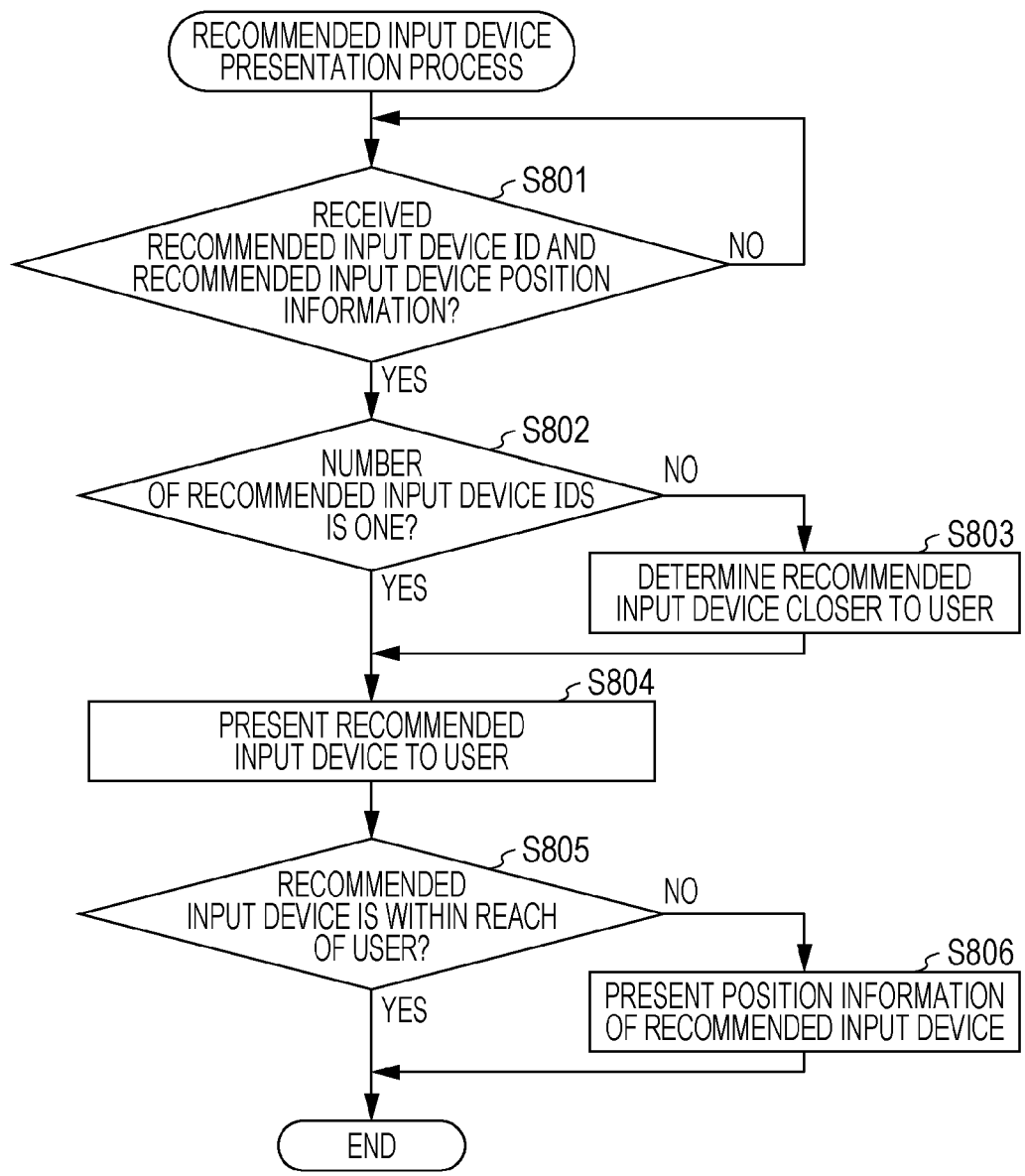
FIG. 14 is a flowchart showing a recommended input device presentation process according to the embodiment.

FIG. 14 is a flowchart showing the steps of the recommended input device presentation process according to the present embodiment. In this process, when the user inputs a speech to the speech input device to operate the target device, the operation method display unit 308 presents, to the user, a recommended input device closer to the user on the basis of the recommended input device and the position information of the recommended input device.

In step S801, the operation method display unit 308 receives the recommended input device IDs and recommended input device position information transmitted in steps S006 and S007, respectively. If it has received no recommended input device IDs or recommended input device position information, the operation method display unit 308 repeats step S801 until it receives them. If the operation method display unit 308 determines in step S802 that a single recommended input device ID has been received in step S801, the process proceeds to step S804. If the operation method display unit 308 determines in step S802 that multiple recommended input device IDs have been received in step S801, the process proceeds to step S804. In step S803, the operation method display unit 308 determines a recommended input device which is closer to the user, of the multiple recommended input device IDs and decides the determined recommended input device as a recommended input device to be presented to the user. Note that all the multiple recommended input devices may be presented to the user without performing steps S802 and S803.

Figure 16:
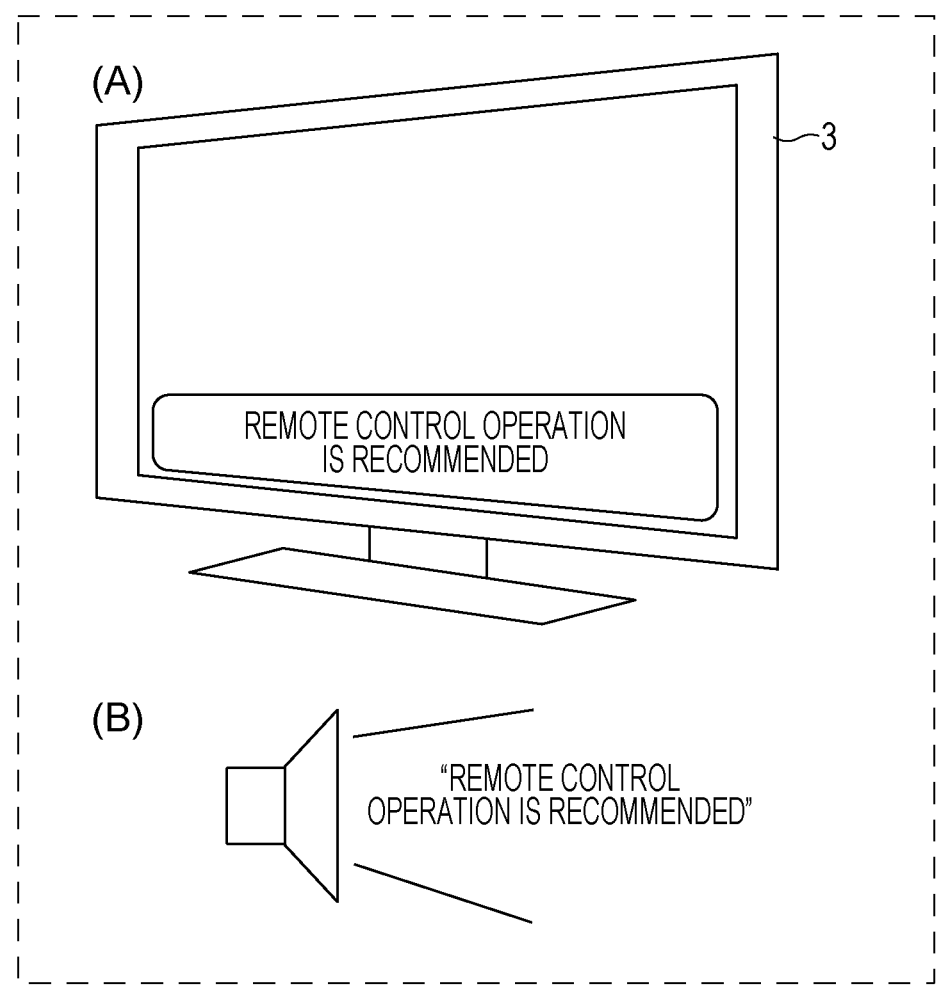
FIG. 16 is a diagram each showing an example of a UI for presenting a recommended input device to a user in the speech operation system according to the embodiment.
Figure 17:
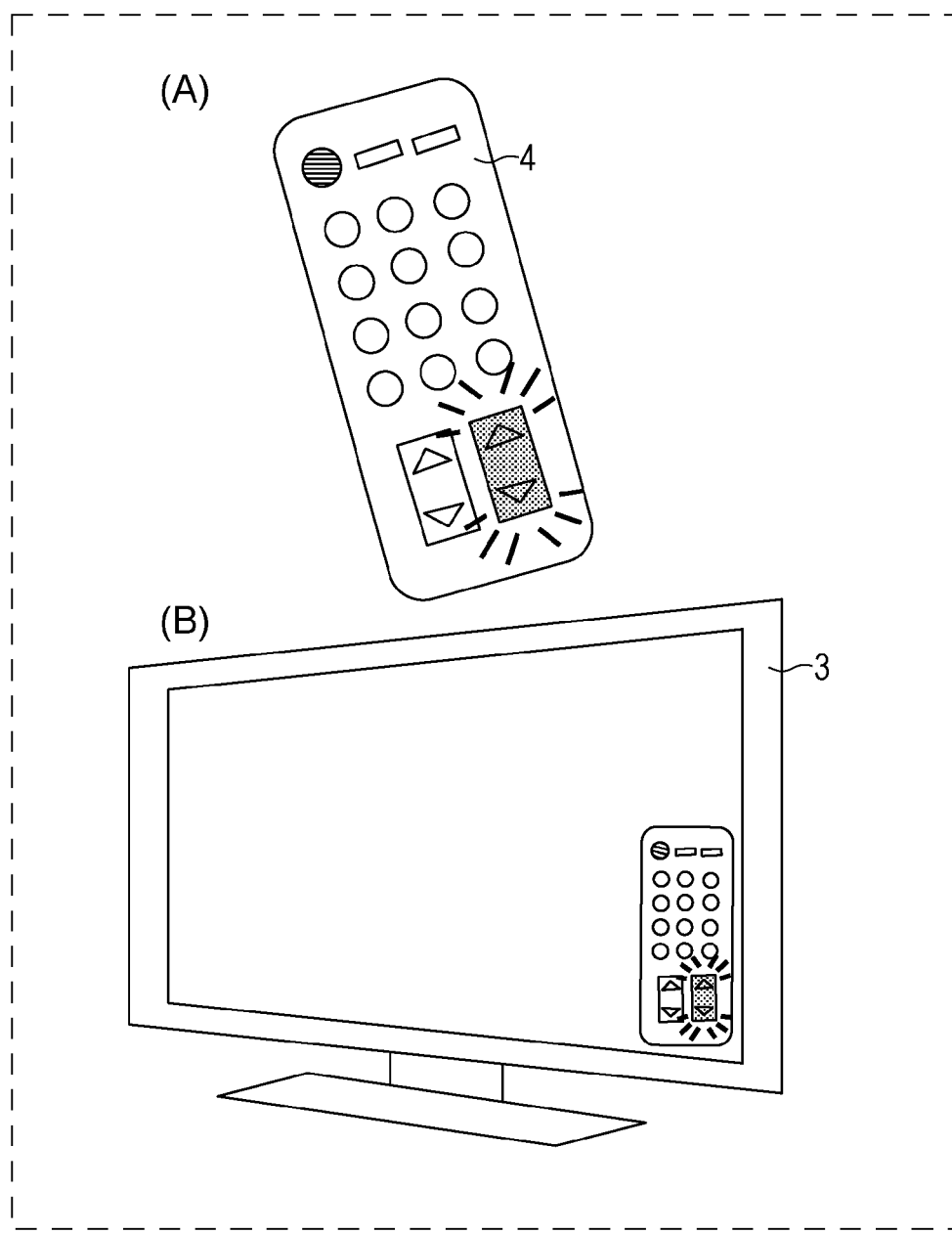
FIG. 17 is a diagram each showing an example of a method for presenting the operation method of a recommended input device to a user in the speech operation system according to the embodiment.

In step S804, the operation method display unit 308 presents the recommended input device other than the speech input device to the user, for example, using a method shown in FIG. 16 or 17. Details of FIGS. 16 and 17 will be described later.

Figure 18:
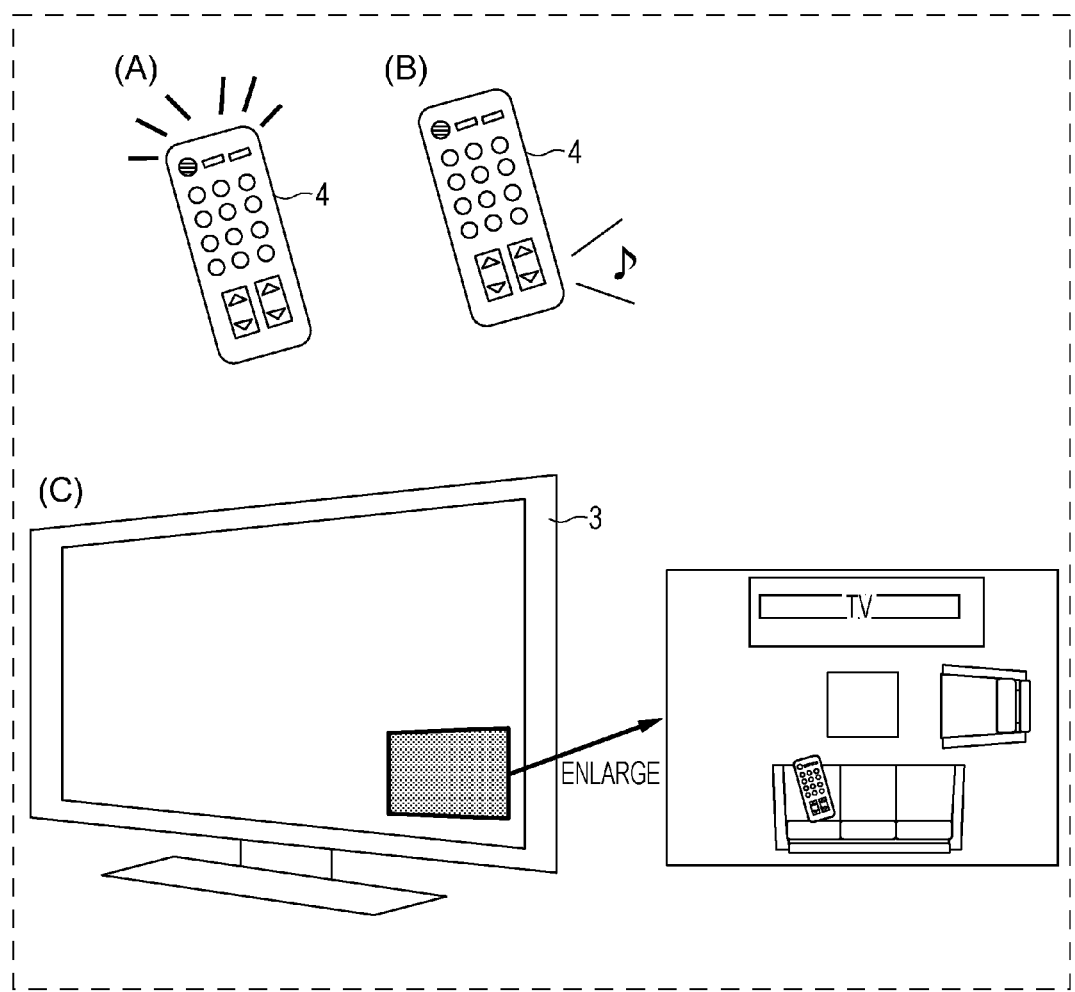
FIG. 18 is a diagrams each showing an example of a method for presenting the position of a recommended input device to a user in the speech operation system according to the embodiment.

In step S805, the operation method display unit 308 determines a method for presenting the position information of the recommended input device to the user on the basis of information as to whether to present the position of the recommended input device and the presentation method information corresponding to the distance between the user and recommended input device described in a table shown in FIG. 15A. If the distance between the user and recommended input device is shortest, the user may be holding the recommended input device, or the recommended input device may be within the reach of the user. Accordingly, the position information of the recommended input device is not presented. In contrast, if the distance between the user and recommended input device is long, the process proceeds to step S806. The operation method display unit 308 presents the position information of the recommended input device to the user, as shown in FIG. 18, on the basis of the presentation method ID corresponding to the distance between the user and recommended input device shown in FIG. 15A and the presentation device and presentation method corresponding to the presentation method ID shown in FIG. 15B. The presentation device or presentation method is not limited to the remote control, television, speech, or screen display and can take various forms.

For example, if the remote control and smartphone are recommended with respect to the operation instruction inputted by the user, the operation method display unit 308 receives the respective recommended input device IDs and the position information thereof in step S801. In step S802, the number of recommended input device IDs, which correspond to the remote control and smartphone, is two. Accordingly, the process proceeds to step S803. If the distance between the remote control and user is 50 cm and the distance between the smartphone and user is 80 cm, the operation method display unit 308 determines in step S803 that the remote control is closer to the user than the smartphone. In step S804, the operation method display unit 308 presents recommended input device information such as "remote control is recommended" to the user on the basis of the determination in step S803. In step S805, the remote control is distant from the user by 50 cm. Accordingly, the process proceeds to step S806. The operation method display unit 308 presents recommended input device position information to the user by causing the remote control to emit a sound.

If a recommended input device which is distant from the user is presented to the user, the user must take time and effort to move to search for or acquire the recommended input device. Thus, the user may feel annoyed about the use of the recommended input device. In view of the foregoing, if multiple recommended input devices are previously set, the operation method display unit 308 presents, to the user, a recommended input device which is closest to the user, of the recommended input devices on the basis of the positions of the user and recommended input devices. Thus, even if all the recommended input devices are distant from the user, the user can know the position of the recommended input device which is the closest to the user. As a result, the user no longer has to take the time and effort to move to search for or acquire the recommended input device which is distant from the user. Further, presenting a recommended input device to the user can assist the user in selectively using the speech input device and the multiple input devices including the remote control.

FIG. 15A is a diagram showing an example of a presentation method determination table, and FIG. 15B is a diagram showing an example of a presentation method ID table.

In the presentation method determination table, the respective distances D between the user and recommended input device and corresponding information as to whether to present the position information of the recommended input device and presentation method IDs are stored in the transverse (row) direction. Note that while the information as to whether to present the position information and the presentation method are changed at 0.3 m and 1.0 m in FIG. 15A, these distances are not limiting. Further, while the range of the distance between the user and recommended input device are divided into three ranges and information as to whether to present the position information and the presentation method vary among the three ranges in FIG. 15A, there may be used other configurations, for example, one in which the range of the distance between the user and recommended input device is divided into two or four or more ranges and information as to whether to present the position information and the presentation method vary among such ranges. In the presentation method determination table, respective presentation method IDs and corresponding presentation devices and presentation methods are stored in the transverse (row) direction. The stored presentation devices and presentation methods are, for example, devices and methods shown in FIGS. 16, 17 and 18A to 18C.

FIG. 16 is a drawing showing an example of a user interface (UI) for presenting a recommended input device to the user in the speech operation system according to the present embodiment. These drawings show examples of a UI which when there is a recommended input device that is more suitable for inputting an device operation than speech input, presents such a recommended input device to the user. In these examples, the user who has inputted speeches consecutively to change the volume of the television as the target device 3 is being recommended to operate the television using the remote control. As shown in Part (A) of FIG. 16, a display screen stating "remote control operation is recommended" may be displayed on the television. Or, as shown in Part (B) of FIG. 16, a sound stating "remote control operation is recommended" may be emitted from a speaker included in the television or remote control. Yet another presentation method may be to present the user with new information indicating that there is another recommended input device rather than presenting specific information indicating that "remote control operation is recommended" and then to present the user with detailed information only when the user needs it.

FIG. 17 is a drawing showing an example of a method for specifically presenting the user with the operation method of a recommended input device in the speech operation system according to the present embodiment. These drawings show examples of a method for, when there is a recommended input device that is more suitable for inputting a device operation than speech input, specifically presenting the user with the operation method of the recommended input device. For example, the user who has inputted speeches consecutively to change the volume of the television is recommended to operate the buttons of the remote control. As shown in Part (A) of FIG. 17, the volume control buttons of the remote control may be allowed to light up. As shown in Part (B) of FIG. 17, another presentation method may be to display a remote control image on the television screen and to highlight portions corresponding to the volume control buttons in the displayed remote control image. Thus, the user can understand which buttons of the remote control should be pressed to perform the function which the user has performed using speech input.

FIG. 18 is a drawing showing an example of a method for presenting the user with the position of a recommended input device in the speech operation system according to the present embodiment. These drawings show examples of a method for, when there is a recommended input device that is more suitable for inputting a device operation than speech input, presenting the user with the position of the recommended input device. For example, as shown in Part (A) of FIG. 18, the user may be informed of the position of the remote control by lighting the remote control itself. Alternatively, as shown in Part (B) of FIG. 18, the user may be informed of the position of the remote control by causing the remote control to emit a sound. Alternatively, as shown in Part (C) of FIG. 18, the position of the remote control may be presented by displaying a sketch of the room on the television screen. Note that instead of presenting the precise position of the remote control, the range in which the remote control is more likely to be placed, the direction in which the remote control is placed with respect to the television or user, or the like may be presented.

Hereafter, the above processes will be described using specific examples. For example, assume that the user has issued a speech "increase the volume" toward the television. First, the speech input device 1 performs the feature value extraction process S001 on the speech signal issued by the user. In the speech recognition process S002, the server 2 converts the extracted speech feature value into character strings or word strings on the basis of the information in the speech recognition dictionary storage unit 203. The server 2 then performs the device operation determination process S003 on the basis of the resulting character strings or word strings. Thus, the server 2 determines that the speech issued by the user intends a "volume control" operation. Then, the target device 3 performs the device operation process S004 on the basis of the determination to increase the volume of the television. The target device 3 then performs the consecutive operation determination process S005. Specifically, the target device 3 determines whether volume control operation commands have been performed consecutively, determines that the volume control operation command is the first one, and stores the operation command in the operation command storage table 304, ending the process.

Subsequently, for example, the user feels that the single volume control operation is not sufficient and then issues another speech "increase the volume" toward the television. Then, the speech input device 1, server 2, and target device 3 perform similar processes to those which have been performed on the first speech until the consecutive operation determination process S005. Since the volume control operation command is stored in the operation number N001 of the operation command storage table 304, the target device 3 determines that the user has inputted the two volume control operation commands consecutively. That is, it determines that the user has inputted the same operation commands consecutively. Accordingly, the target device 3 performs the recommended input device presentation determination process S006. Specifically, it determines whether there are any recommended input devices other than the speech input device in controlling the volume. The target device 3 then determines that the remote control or smartphone is more suitable for controlling the volume than speech input, and the input devices 4 perform the recommended input device position determination process S007. As a result, the input devices 4 calculate the distance between the user and remote control, for example, as 25 cm and the distance between the user and smartphone, for example, as 50 cm. Thus, the target device 3 determines that the recommended input device to be presented to the user is the remote control. The target device 3 then performs the recommended input device presentation process S008 on the basis of the determination. Specifically, it causes the television to emit a sound stating "remote control operation is recommended" toward the user.

By presenting the recommended input device in this manner, it is possible to present a fast-feedback input device such as the remote control to the user with respect to a troublesome operation such as volume control, in which the user must input an speech "increase the volume" or a speech "decrease the volume" to the speech input device a number of times. Thus, the user can learn that the remote control or smartphone is recommended in controlling the volume. Such learning finally allows the user to select a recommended input device for each operation by himself or herself.

In the above example, when the user has inputted the same operation instructions consecutively using speeches, the target device 3 performs the recommended input device presentation determination process. Next, there will be described a process of performing the recommended input device presentation determination process on the basis of the frequency with which the same operation command has been inputted.

Figure 19:
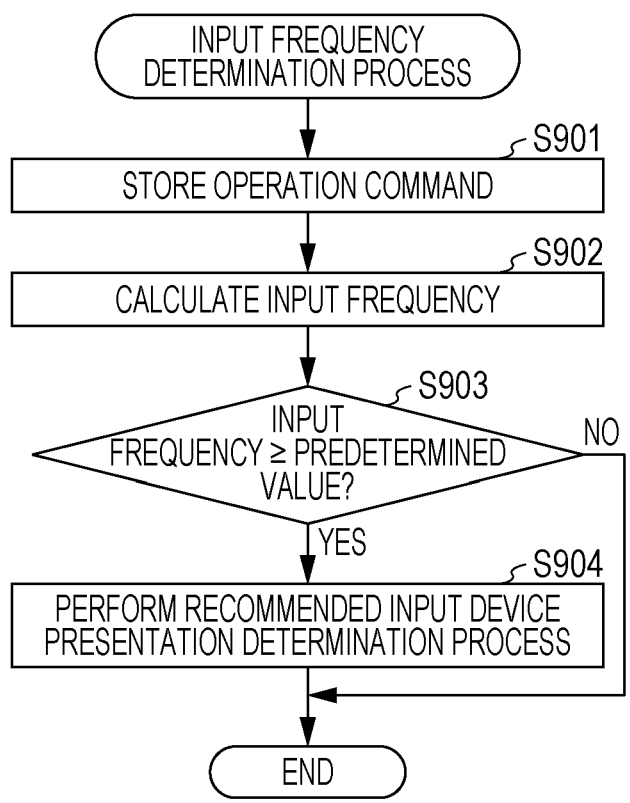
FIG. 19 is a flowchart showing an input frequency determination process according to the embodiment.

FIG. 19 is a flowchart showing the steps of an input frequency determination process. In this process, the target device 3 calculates the frequency with which the same type of operation command as the current operation command has been inputted within a predetermined period of time and, if the calculated input frequency is greater than or equal to a predetermined value, presents a recommended input device to the user.

In step S901, the target device 3 stores the operation command transmitted in step S304 in an operation command storage table (history information) including time information as shown in FIG. 11B.

In step S902, the consecutive operation determination unit 303 calculates the frequency with which the same type of operation command as the current operation command has been inputted within the predetermined period of time (input frequency). The predetermined period of time may be any period of time and is set to, for example, 10 sec, 1 min, 30 min, or 1 h in accordance with the type of the target device. In the example of FIG. 11B, the same type of two operation commands have been inputted within one min.

In step S903, the consecutive operation determination unit 303 determines whether the input frequency is greater than or equal to a predetermined value. The predetermined value may be any value and is set to, for example, two. If the input frequency is greater than or equal to the predetermined value, the recommended input device determination unit 305 performs the recommended input device presentation determination process in step S904, and the operation method display unit 308 presents a recommended input device to the user on the basis of the determination. For example, the operation method display unit 308 presents the remote control or smartphone, which is an input device other than the speech input device, to the user as a recommended input device. If the input frequency is not greater than or equal to the predetermined value, the recommended input device determination unit 305 ends the process without performing the recommended input device presentation determination process.

As seen above, if the user has controlled the volume of the television using speech input a number of times within a short period of time, it is possible to present a fast-feedback input device such as the remote control to the user with respect to the troublesome operation using speech input. Thus, the user can learn that the remote control or smartphone is recommended in controlling the volume. Such learning finally allows the user to select a recommended input device for each operation by himself or herself.

Next, there will be described a process of learning the operation of the target device which has changed in accordance with an operation command and controlling the target device on the basis of the learned operation.

Figure 20:
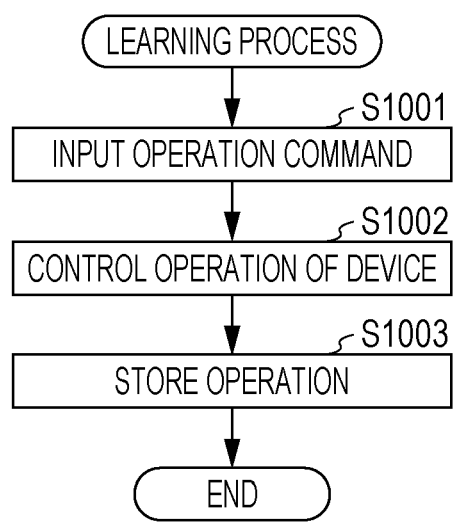
FIG. 20 is a flowchart showing a learning process according to the embodiment.

FIG. 20 is a flowchart showing the steps of a learning process. In this process, the target device 3 manages, as history information, the operation thereof which has changed in accordance with an operation command.

In step S1001, the communication unit 301 of the target device 3 receives an operation command. In step S1002, the device control unit 302 controls the operation of the target device 3. For example, if the user inputs a speech stating "increase the volume by 10" when the volume of the television is 15, the device control unit 302 increases the volume of the television by 10, thereby setting the volume to 25. In step S1003, the device control unit 302 stores, as history information, the operation in which the television volume of 15 has been changed to 25. The operation may be stored in the operation command storage table 304 serving as history information or may be stored in history information which is different from the operation command storage table 304. For another example, if the user inputs a speech stating "change the volume to 25," the device control unit 302 sets the volume of the television to 25. The device control unit 302 then stores, as history information, the operation in which the volume of the television has been changed to 25. By accumulating operations in this manner, it is possible to obtain a learning result indicating that "when increasing the volume, the volume is often changed to 25." By controlling the device on the basis of such a learning result, it is possible to set the device in accordance with the preferences of the user. Further, since the history information includes specific numerals such as the amount of variation of volume, it is possible to accurately set the device in accordance with the preferences of the user.

Figure 21:
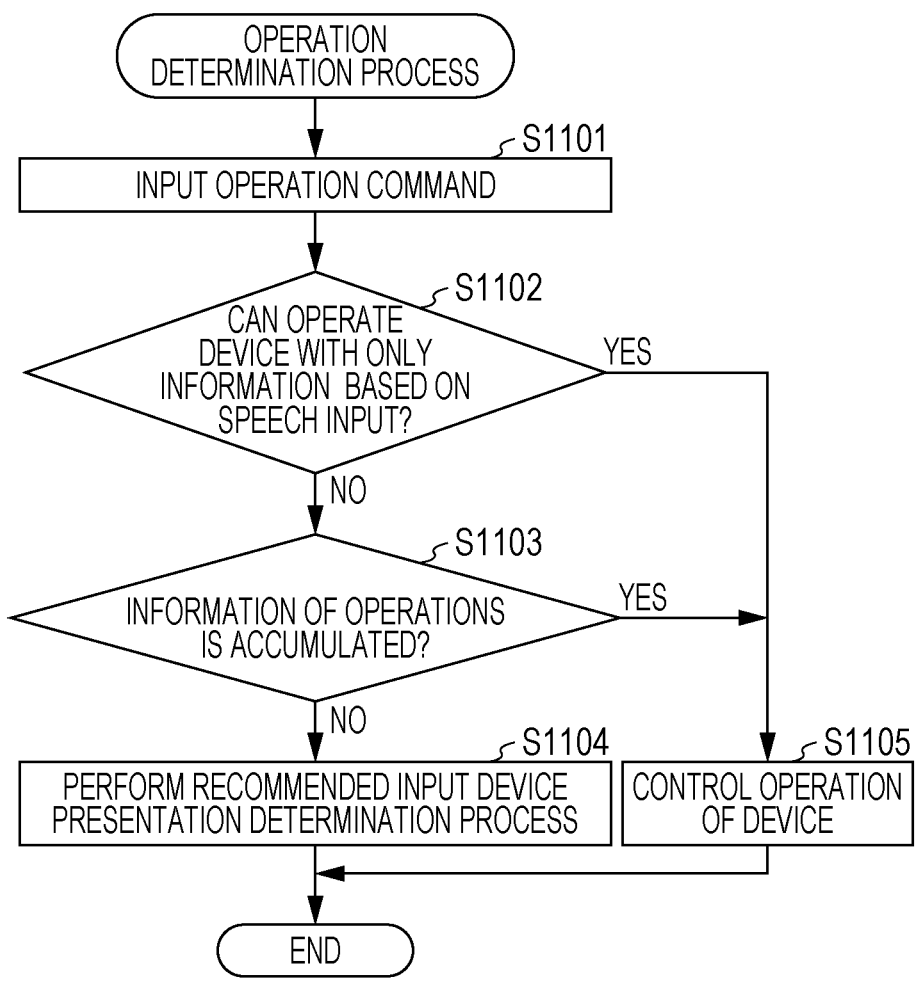
FIG. 21 is a flowchart showing an operation determination process according to the embodiment.

FIG. 21 is a flowchart showing the steps of a process of determining operations corresponding to an operation command.

In step S1101, the communication unit 301 receives an operation command. In step S1102, the device control unit 302 determines whether it can operate the device in accordance with the operation command, which is based on speech input. For example, if a speech stating "increase the volume by 10" has been inputted, the device control unit 302 can operate the device, since the amount of volume to be increased is obvious. Accordingly, in step S1105, the device control unit 302 increases the volume of the television by 10.

On the other hand, if a speech stating "increase the volume" has been inputted, the device control unit 302 determines that it cannot operate the device, since the amount of volume to be increased is not obvious. Accordingly, the process proceeds to step S1103.

In step S1103, the device control unit 302 determines whether history information of operations corresponding to commands indicating "increase the volume" is accumulated. For example, the device control unit 302 determines whether corresponding multiple operations are accumulated. If so determined, the device control unit 302 operates the device in accordance with the operations in step S1105. For example, if operations in which the volume has been changed to 25 are accumulated, the device control unit 302 sets the volume of the television to 25.

If not so determined, the recommended input device determination unit 305 performs a recommended input device presentation determination process in step S1104, and the operation method display unit 308 presents a recommended input device to the user on the basis of the determination. Thus, the user, who may control the volume using speech input a number of times, can avoid performing such troublesome operations. The recommended input device presented is, for example, the remote control or smartphone, which is an input device other than the speech input device.

Figure 22:
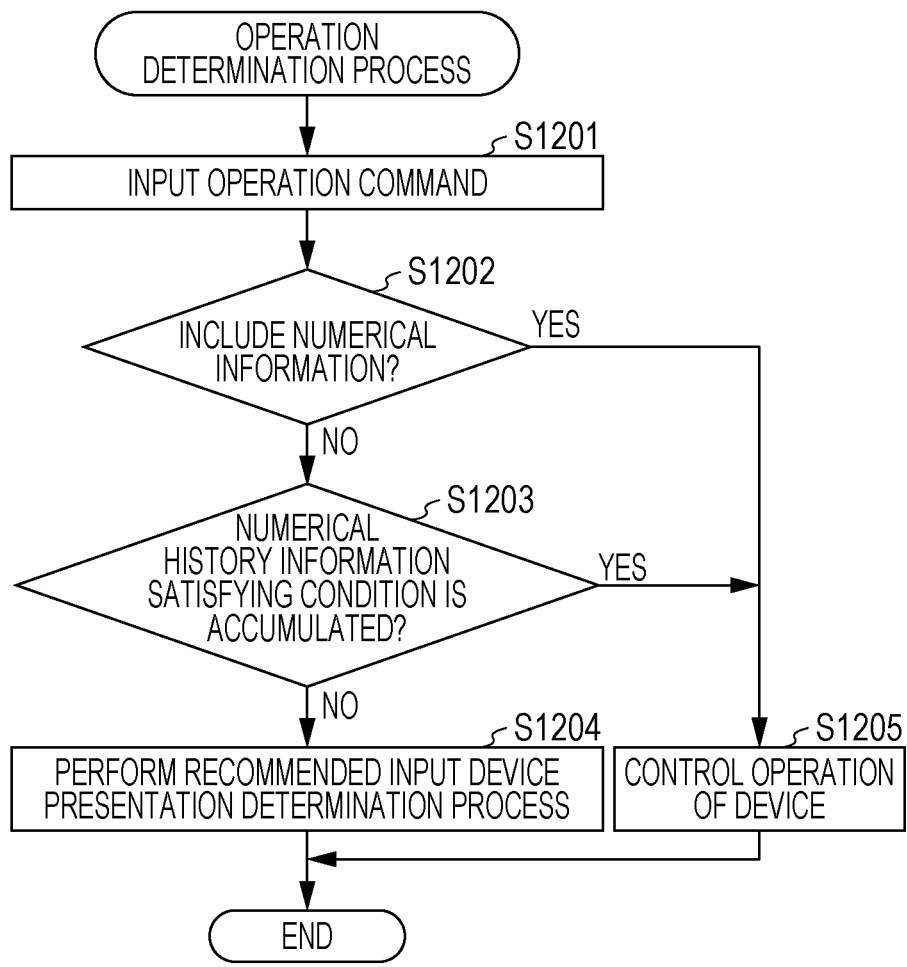
FIG. 22 is a flowchart showing an operation determination process according to the embodiment.

FIG. 22 is a flowchart showing another example of a process of determining an operation corresponding to an operation command.

In step S1201, the communication unit 301 receives an operation command. In step S1202, the device control unit 302 determines whether the operation command, which is based on speech input, includes numerical information. The numerical information represents a specific numeral indicating the amount of variation by which the operation of the target device is changed. For example, if a speech stating "increase the volume by 10" has been inputted, the corresponding operation command includes the numeral of 10, by which the volume is to be increased. Accordingly, in step S1205, the device control unit 302 increases the volume of the television by 10.

In contrast, if the operation command does not include any numerical information, for example, if a speech stating "increase the volume" has been inputted, the process proceeds to step S1203. In step S1203, the device control unit 302 determines whether numerical history information satisfying a condition is accumulated. For example, if there is a condition that the current volume of the television is 15 and if history information that the television volume of 15 has been changed to 25 by increasing it by 10 is accumulated, the device control unit 302 sets the volume of the television to 25 by increasing it by 10 in step S1205.

In contrast, if the device control unit 302 determines that any history information satisfying the condition is not accumulated, the recommended input device determination unit 305 performs a recommended input device presentation determination process in step S1204, and the operation method display unit 308 presents a recommended input device to the user on the basis of the determination. Thus, the user, who may control the volume using speech input a number of times, can avoid performing such troublesome operations. The recommended input device presented is, for example, the remote control or smartphone, which is an input device other than the speech input device.

Figure 23:
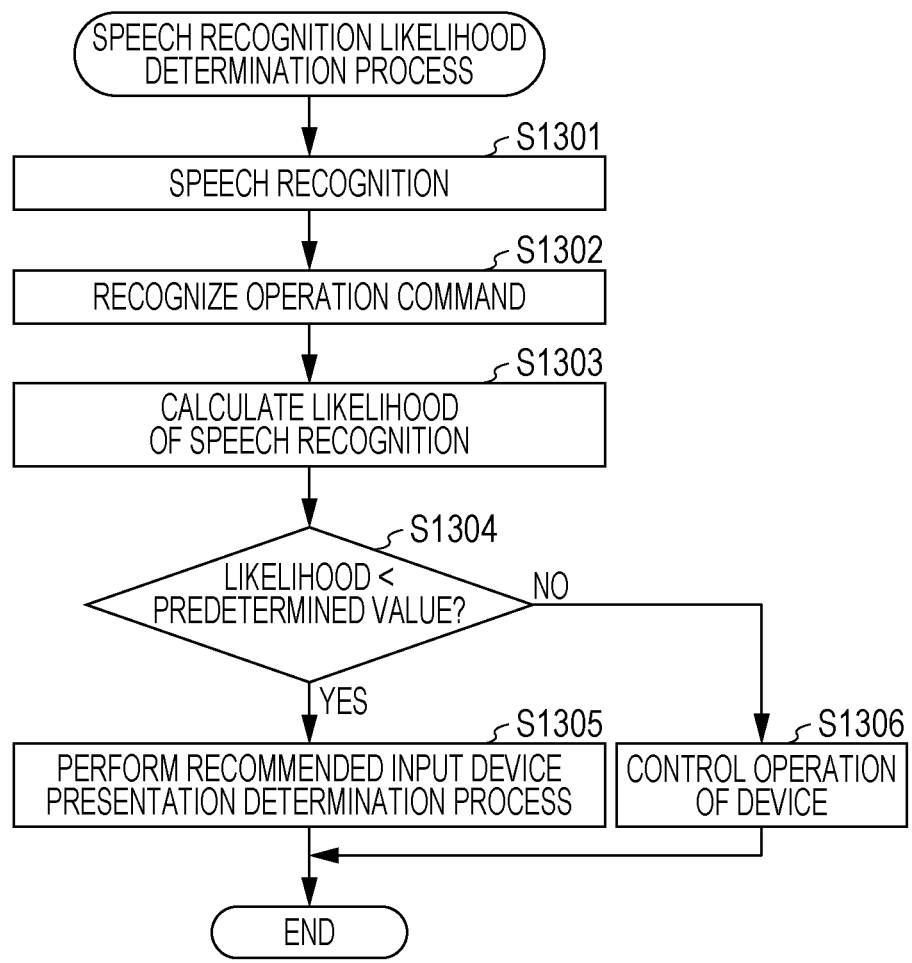
FIG. 23 is a flowchart showing a speech recognition likelihood determination process according to the embodiment.

Next, there will be described a process of performing a recommended input device presentation determination process on the basis of the likelihood of speech recognition. FIG. 23 is a flowchart showing the steps of a speech recognition likelihood determination process. In this process, an operation instruction is recognized from speech information; the likelihood of the recognized operation instruction is calculated; if the likelihood is lower than a predetermined value, a recommended input device suitable for the corresponding operation command is presented to the user.

In step S1301, the speech recognition unit 202 converts a received speech feature value into character strings or word strings. In step S1302, the device operation determination unit 204 recognizes an operation command on the basis of the result of the speech recognition. Note that if the target device 3 has the functions of the speech recognition unit 202 and device operation determination unit 204, it performs these processes.

In step S1303, the device control unit 302 calculates the likelihood of the speech recognition. For example, the likelihood can be obtained by calculating the distance between the recognized speech and a language model serving as a reference. In this case, the likelihood is higher as the calculated distance is shorter.

Subsequently, in step S1304, the device control unit 302 determines whether the calculated likelihood is lower than a predetermined value. The predetermined value may be any value. If the likelihood is higher than or equal to the predetermined value, the device control unit 302 controls the device in accordance with the recognized operation command in step S1306.

In contrast, if the likelihood is lower than the predetermined value, the recommended input device determination unit 305 performs a recommended input device presentation determination process in step S1305, and the operation method display unit 308 presents a recommended input device to the user on the basis of the determination. The recommended input device presented is, for example, the remote control or smartphone, which is an input device other than the speech input device. If the likelihood is low, an operation based on the inputted speech is more likely to be different from the operation intended by the user. In this case, by presenting a recommended input device, it is possible to avoid performing the operation different from the operation intended by the user.

Figure 24:
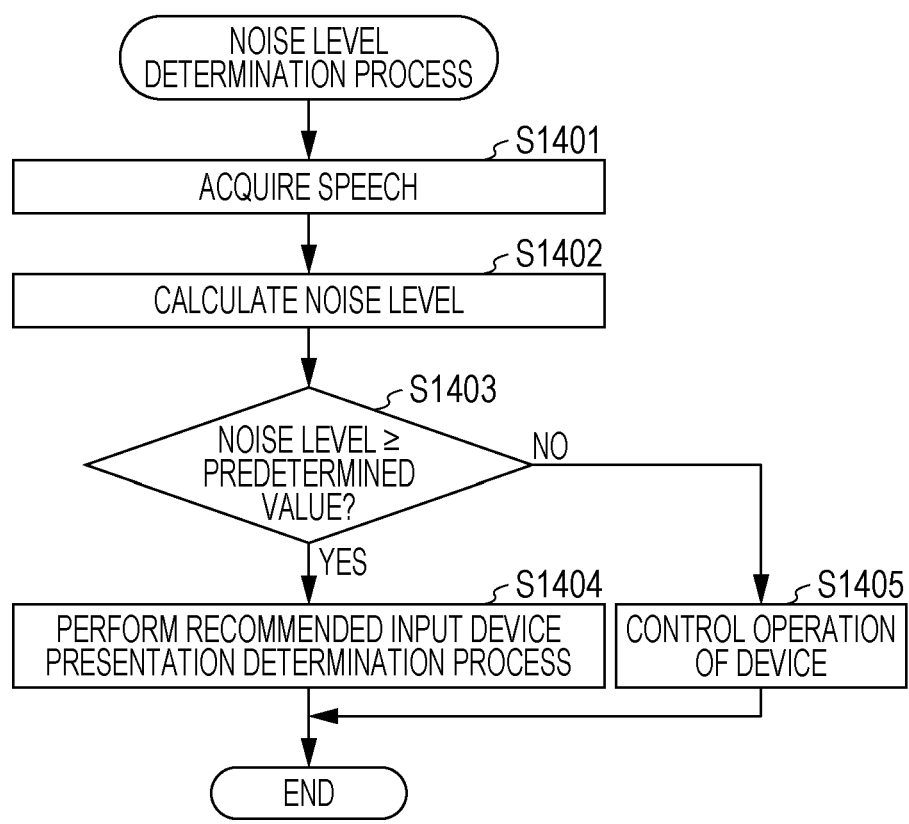
FIG. 24 is a flowchart showing a noise level determination process according to the embodiment.

Next, there will be described a process of performing a recommended input device presentation determination process on the basis of the noise level of an acquired speech. FIG. 24 is a flowchart showing the steps of a noise level determination process. In this process, the noise level of speech information is calculated, and if the noise level is higher than or equal to a predetermined value, a recommended input device suitable for the corresponding operation command is presented to the user.

In step S1401, the speech recognition unit 202 acquires speech information including a speech feature value. This speech information includes the environmental sound around the speech input device and an operation instruction issued to the target device. In step S1402, the speech recognition unit 202 calculates the noise level of the speech information. For example, the noise level can be calculated by obtaining S/N by making comparison between the sound pressures of the noise and speech. In this case, the noise level is higher as S/N is lower.

Subsequently, in step S1403, the speech recognition unit 202 determines whether the calculated noise level is higher than or equal to a predetermined value. The predetermined value may be any value. If the noise level is lower than the predetermined value, the device control unit 302 controls the target device in accordance with an operation command recognized from the speech information in step S1405.

In contrast, if the noise level is higher than or equal to the predetermined value, the recommended input device determination unit 305 performs a recommended input device presentation determination process in step S1404, and the operation method display unit 308 presents a recommended input device to the user on the basis of the determination. The recommended input device presented is, for example, the remote control or smartphone, which is an input device other than the speech input device. If the noise level is high, an operation based on the inputted speech is more likely to be different from the operation intended by the user. In this case, by presenting a recommended input device, it is possible to avoid performing the operation different from the operation intended by the user.

Note that a recommended input device presentation determination process may be performed based on both the noise level and likelihood.

The processes described in the present embodiment may be performed by any of hardware, software, and a combination thereof. A computer program for causing hardware or the like to perform those processes may be stored in a memory and then executed by a microcomputer. Such a computer program may be installed from a recording medium (semiconductor memory, optical disk, etc.) storing the computer program to the respective devices or may be downloaded through an electrical communication line such as the Internet. Such a computer program may also be wirelessly installed into the respective devices.

For example, the technology described in the above aspect can be implemented in the following types of cloud services. However, these types of cloud services are only illustrative.

Service Type 1: Company's Own Data Center Type Cloud Services

Figure 26:
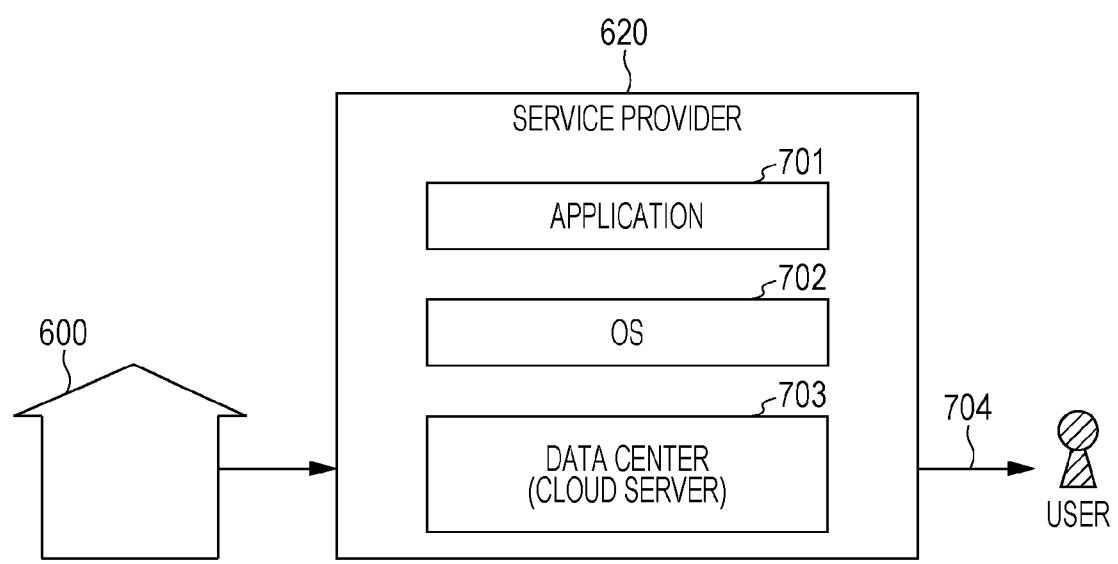
FIG. 26 is a diagram showing an overview of services provided by an information management system of service type 1 (own data center type cloud services) according to the embodiment.

FIG. 26 is a diagram showing an overview of services provided by an information management system of service type 1 (own data center type cloud services). In the present type, a service provider 620 acquires information from a group 600 and provides services to a user. In the present type, the service provider 620 has the functions of a data center operating company. That is, the service provider 620 holds a cloud server which manage big data. Accordingly, there is no data center operating company.

In the present type, the service provider 620 operates and manages a data center (cloud server) 703. The service provider 620 also manages an operating system (OS) 702 and an application 701. The service provider 620 provides services using the OS 702 and application 701 (arrow 704).

Service Type 2: IaaS Cloud Services

Figure 27:
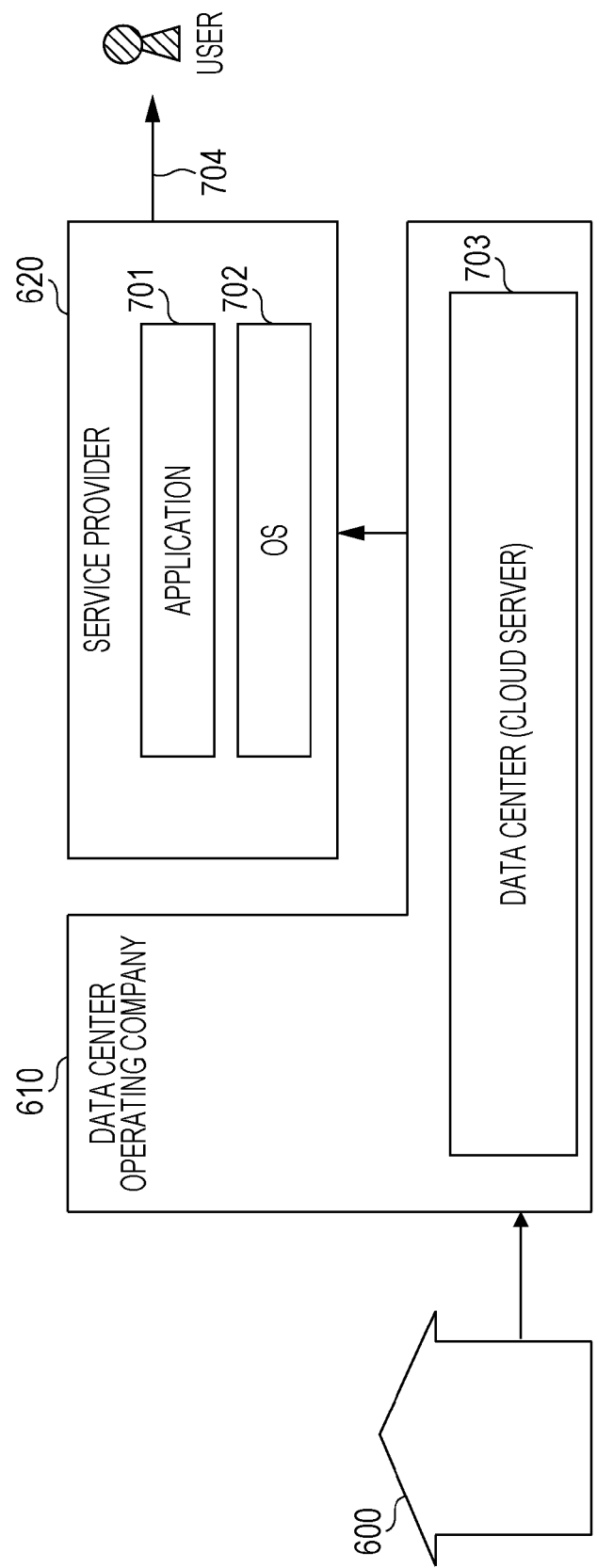
FIG. 27 is a diagram showing an overview of services provided by an information management system of service type 2 (IaaS cloud services) according to the embodiment.

FIG. 27 is a diagram showing an overview of services provided by an information management system of service type 2 (IaaS cloud services). As used herein, IaaS is the abbreviation of infrastructure as a service and is a cloud service providing model which provides an infrastructure for constructing and operating a computer system, as a service through the Internet.

In the present type, a data center operating company 610 operates and manages a data center (cloud server) 703. A service provider 620 manages an OS 702 and an application 701. The service provider 620 provides services using the OS 702 and application 701 (arrow 704).

Service Type 3: PaaS Cloud Services

Figure 28:
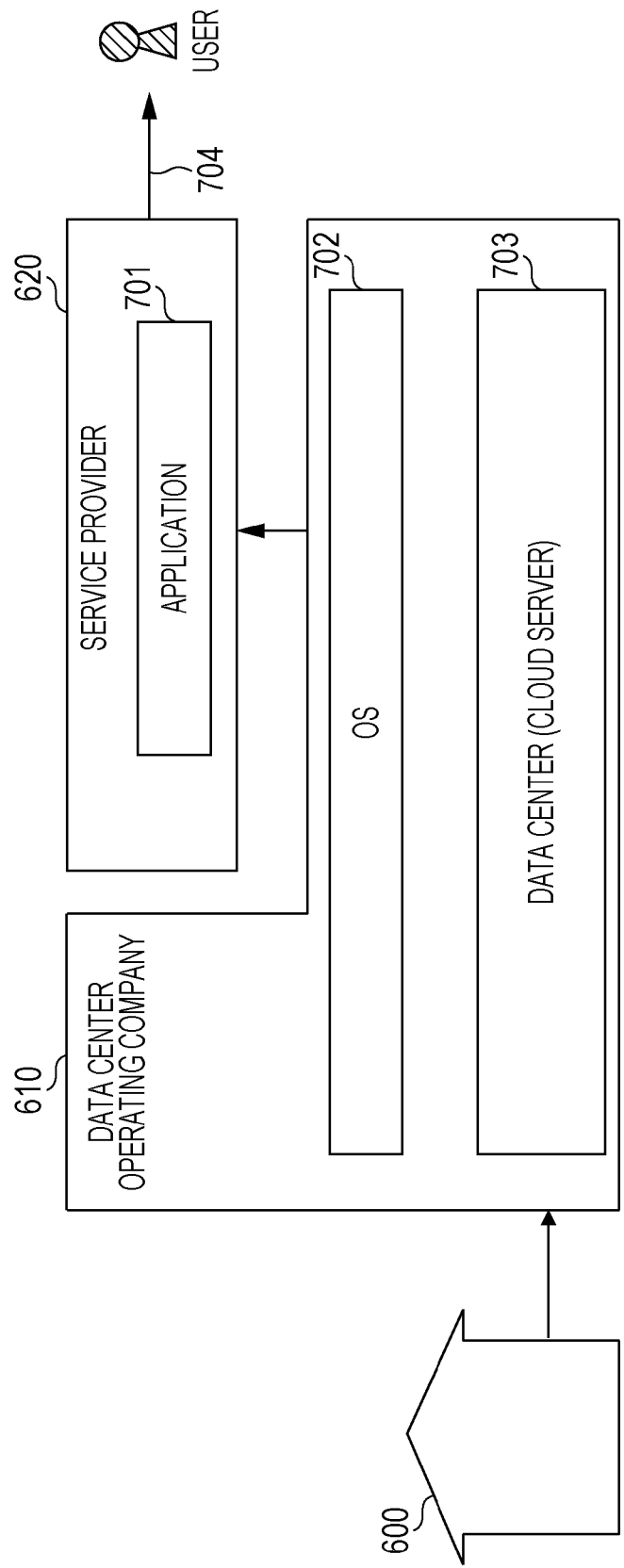
FIG. 28 is a diagram showing an overview of services provided by an information management system of service type 3 (PaaS cloud services) according to the embodiment.

FIG. 28 is a diagram showing an overview of services provided by an information management system of service type 3 (PaaS cloud services). As used herein, PaaS is the abbreviation of platform as a service and is a cloud service providing model which provides a platform serving as an infrastructure for constructing and operating software, as a service through the Internet.

In the present type, a data center operating company 610 manages an OS 702 and operates and manages a data center (cloud server) 703. A service provider 620 manages an application 701. The service provider 620 provides services using the OS 702 and application 701 (arrow 704).

Service Type 4: SaaS Cloud Services

FIG. 29 is a diagram showing an overview of services provided by an information management system of service type 4 (SaaS cloud services). As used herein, SaaS is the abbreviation of software as a service. SaaS cloud services are, for example, a cloud service providing model which allows users not holding a data center (cloud server) such as companies or individuals to use an application provided by a platform provider holding a data center (cloud server) through a network such as the Internet.

In the present type, a data center operating company 610 manages an application 701 and an OS 702 and operates and manages a data center (cloud server) 703. A service provider 620 provides services using the OS 702 and application 701 (arrow 704).

As seen above, in any of the cloud services types, the service provider 620 provides services. The service provider or data center operating company may develop an OS, application, a database of big data, or the like on its own or may outsource such development to a third party.

The technology of the present disclosure is particularly useful in the field of technologies that control the operation of a device using a speech.

What is claimed is:

1. A method for controlling an operation of a target device using a plurality of input devices, the method comprising:
   receiving, from one of the plurality of the input devices, a first operation command to control the target device, with a first data format, the first operation command corresponding to a first operation instruction being inputted, by a user, to the one of the plurality of input devices;
   recognizing the received first operation command and the first data format;
   determining that the one of the plurality of the input devices is a first input device corresponding to the recognized first data format; and
   informing the user of a second input device as a recommended input device to input the first operation instruction of an operation for inputting an operation instruction, by the user, to the second input device being different from an operation for inputting an operation instruction, by the user, to the first input device, when it is determined that an operation to be performed by executing the first operation command is identical to an operation to be performed by executing an operation to be performed by executing a second operation command that is received from the second input device earlier than the reception of the first operation command from the first input device.

2. The method according to claim 1,
   wherein the first input device includes a speech input device, a remote controller, or a mobile phone, and
   wherein the first data format includes a data format for a communication using at least one of a speech input device, a remote controller, and a mobile phone.

3. The method according to claim 1,
   wherein each of the operations to be performed by executing the first operation command and the operations to be performed by executing the second operation command includes a control for turning on/off power of the target device.

4. The method according to claim 1,
   wherein each of the operations to be performed by executing the first operation command and the operations to be performed by executing the second operation command includes a volume control when the target device is a television set.

5. The method according to claim 1,
   wherein each of the operations to be performed by executing the first operation command and the operations to be performed by executing the second operation command includes an airflow control when the target device is an air conditioner.

6. The method according to claim 1, further comprising:
   determining whether the operation for inputting and operation instruction, by the user, to the first operation instruction is identical to the operation for inputting an operation instruction, by the user, to the second operation instruction, when a second time when the second operation command is received from the second input device falls within a predetermined time period prior to a first time when the first operation command is received from the first input device.

7. The method according to claim 1, further comprising: determining whether the operation for inputting an operation instruction, by the user, to the first operation instruction is identical to the operation for inputting an operation instruction, by the user, to the second operation instruction, when the second operation command is received from the second input device immediately before a first time when the first operation command is received from the first input device.

8. The method according to claim 1, further comprising: storing recommended input device information about the second input device suitable to the first operation instruction; and
determining that the first operation instruction is suitable to the operation for inputting an operation instruction, by the user, to the second input device based on the recommended input device information.

9. The method according to claim 1, wherein the target device can receive the first operation command from the second input device.

10. The method according to claim 1, wherein the second input device includes at least one of a speech input device, a remote controller, and a mobile phone.

11. The method according to claim 10, wherein a sound stating that the second input device is the speech input device, the remote controller, or the mobile phone is outputted toward the user.

12. The method according to claim 1, wherein the target device is a television set, and the second input device includes a remote controller, wherein the user is informed of the second input device as the recommended input device by displaying on a display device of the television set an image i) indicating an appearance of the remote controller, and ii) highlighting an operation portion capable of inputting the first operation instruction, of the remote controller.

13. The method according to claim 1, further comprising: storing time information indicating a time when each of operation commands has been received; and
calculating a receiving frequency of an operation command to perform the same operation as the first operation command indicates in a predetermined period of time, based on the time information, to inform the user of the second input device as the recommended input device based on the calculated receiving frequency.

14. The method according to claim 13, wherein if the calculated receiving frequency is greater than or equal to a predetermined value, the user is informed of the second input device as the recommended input device.

15. The method according to claim 1, further comprising: recognizing whether the first input device is the speech input device;
recognizing whether the first operation command does not include an operating range for an operation indicated by the first operation instruction;
when the first input device is recognized to be the speech input device and when the first operation command does not include the operating range, determining that the speech input device is not suitable to the first operation instruction.

16. An electric device, wherein operation of the electric device is controllable using a plurality of input devices, the electric device comprising:
a processor; and
a non-transitory memory storing thereon a program, which when executed by the processor, causes the processor to
receive, from one of the plurality of the input devices, a first operation command to control the electric device, with a first data format, the first operation command corresponding to a first operation instruction being inputted, by a user, to the one of the plurality of input devices;
recognize the received first operation command and the first data format;
determine that the one of the plurality of the input devices is a first input device corresponding to the recognized first data format; and
inform the user of a second input device as a recommended input device to input the first operation instruction, an operation for inputting an operation instruction, by the user, to the second input device being different from an operation for inputting an operation instruction, by the user, to the first input device, when it is determined that an operation to be performed by executing the first operation command is identical to an operation to be performed by executing a second operation command that is received from the second input device earlier than the reception of the first operation command from the first input device.

17. A non-transitory computer-readable recording medium storing a program for controlling an electric device, wherein operation of the electric device is controllable using a plurality of input devices, the computer program causing a computer of the electric device to:
receive, from one of the plurality of the input devices, a first operation command to control the electric device, with a first data format, the first operation command corresponding to a first operation instruction being inputted, by a user, to the one of the plurality of input devices;
recognize the received first operation command and the first data format;
determine that the one of the plurality of the input devices is a first input device corresponding to the recognized first data format; and
inform to a user of a second input device as a recommended input device to input the first operation instruction, an operation for inputting an operation instruction, by the user, to the second input device being different from an operation for inputting an operation instruction, by the user, to the first input device, when it is determined that an operation to be performed by executing the first operation command is identical to an operation to be performed by executing a second operation command that is received from the second input device earlier than the reception of the first operation command from the first input device.

* * * * *